US012771005B2

(12) United States Patent
Tani et al.

(10) Patent No.: US 12,771,005 B2
(45) Date of Patent: Oct. 20, 2026

(54) WAVEGUIDE ELEMENT

(71) Applicant: NGK INSULATORS, LTD., Nagoya-City (JP)

(72) Inventors: Kentaro Tani, Nagoya (JP); Jungo Kondo, Miyoshi (JP)

(73) Assignee: NGK INSULATORS, LTD., Nagoya (JP)

( * ) Notice: Subject to any disclaimer, the term of this patent is extended or adjusted under 35 U.S.C. 154(b) by 136 days.

(21) Appl. No.: 18/433,548

(22) Filed: Feb. 6, 2024

(65) Prior Publication Data

US 2024/0213644 A1 Jun. 27, 2024

Related U.S. Application Data

(63) Continuation of application No. PCT/JP2022/029939, filed on Aug. 4, 2022.

(30) Foreign Application Priority Data

Aug. 12, 2021 (JP) ................................ 2021-131757
May 25, 2022 (JP) ................................ 2022-085564
Jul. 6, 2022 (JP) ................................ 2022-109198

(51) Int. Cl.
*H01P 3/08* (2006.01)

(52) U.S. Cl.
CPC ...................................... *H01P 3/08* (2013.01)

(58) Field of Classification Search
CPC .. H01P 3/08; H01P 3/003; H01P 3/006; H01P 3/081; H01P 3/122; H01P 11/003;
(Continued)

(56) References Cited

U.S. PATENT DOCUMENTS 4,853,660 A * 8/1989 Schloemann ............. H01P 1/32 333/204
6,674,347 B1 * 1/2004 Maruhashi ............. H05K 1/024 333/161
(Continued)

FOREIGN PATENT DOCUMENTS

JP H09-145514 A 6/1997
JP H10-321986 A 12/1998
(Continued)

OTHER PUBLICATIONS

Lahiji et al., "*Low-Loss Coplanar Waveguide Transmission Lines and Vertical Interconnects on Multi-Layer Parylene-N*," IEEE Topical Meeting on Silicon Monolithic Integrated Circuits in RF Systems, SIRF '09, pp. 1-4, Jan. 19, 2009.
(Continued)

*Primary Examiner* — John W Poos
(74) *Attorney, Agent, or Firm* — Muncy, Geissler, Olds & Lowe, P.C.

(57) ABSTRACT

A waveguide element includes a waveguide member capable of guiding an electromagnetic wave having a frequency of 30 GHz or more and 20 THz or less. The waveguide member includes: an inorganic material substrate; and a conductor layer arranged above the inorganic material substrate. A thickness "t" of the inorganic material substrate satisfies the following expression (1):

$$t < \frac{\lambda}{a\sqrt{\varepsilon}} \tag{1}$$

where "t" represents the thickness of the inorganic material substrate, λ represents a wavelength of an electromagnetic wave to be guided by the waveguide member, ε represents
(Continued)

a relative dielectric constant of the inorganic material substrate, and "a" represents a numerical value of 3 or more.

17 Claims, 22 Drawing Sheets

(58) Field of Classification Search
CPC ........ H01P 5/107; H01P 3/121; H01P 1/2005; H01P 1/20; H01P 5/185; H01P 1/20381; H01P 5/024; H01P 5/08; H01P 7/082; H01P 1/16; H01P 1/20363; H01P 3/088; H01P 3/16; H01P 1/2039; H01P 3/18; H01P 1/18; H01P 1/182; H01P 1/184; H01P 3/06; H01P 3/082; H01P 3/084; H01P 3/165; H01P 5/04; H01P 5/103; H01P 1/207; H01P 11/00; H01P 1/02; H01P 1/042; H01P 1/12; H01P 1/163; H01P 1/2013; H01P 1/20318; H01P 1/20327; H01P 1/2088; H01P 5/184; H01P 1/022; H01P 1/181; H01P 1/203; H01P 1/20309; H01P 1/219; H01P 11/008; H01P 3/087; H01P 5/02; H01P 5/028; H01P 5/087; H01P 5/12; H01P 5/16; H01P 5/18; H01P 5/19; H01P 7/084; H01P 1/2002; H01P 1/20345; H01P 1/208; H01P 1/2138; H01P 1/38; H01P 11/001; H01P 11/002; H01P 11/007; H01P 3/00; H01P 3/026; H01P 3/12; H01P 3/123; H01P 5/082; H01P 5/10; H01P 5/188; H01P 7/08; H01P 9/00; H01P 1/047; H01P 1/11; H01P 1/162; H01P 1/201; H01P 1/20336; H01P 1/2056; H01P 1/213; H01P 1/215; H01P 1/222; H01P 1/227; H01P 1/32; H01P 11/006; H01P 3/02; H01P 3/10; H01P 5/085; H01P 7/06; H01P 7/065; H01P 7/088; H01P 7/10
See application file for complete search history.

(56) References Cited

U.S. PATENT DOCUMENTS

| | | | | |
|---|---|---|---|---|
| 8,922,425 | B2 | 12/2014 | Hayata | |
| 11,677,373 | B2 | 6/2023 | Flemming et al. | |
| 2010/0253450 | A1* | 10/2010 | Kim | H01P 3/121 333/239 |
| 2012/0013421 | A1 | 1/2012 | Hayata | |
| 2012/0319796 | A1* | 12/2012 | Miyata | H01P 5/107 333/26 |
| 2020/0382089 | A1 | 12/2020 | Flemming et al. | |

FOREIGN PATENT DOCUMENTS

| | | | |
|---|---|---|---|
| JP | H11-074645 | A | 3/1999 |
| JP | H11-233674 | A | 8/1999 |
| JP | 2000-277661 | A | 10/2000 |
| JP | 2003-198130 | A | 7/2003 |
| JP | 2004-023192 | A | 1/2004 |
| JP | 2005-051330 | A | 2/2005 |
| JP | 2016-001759 | A | 1/2016 |
| JP | 2018-023030 | A | 2/2018 |
| JP | 2021-509767 | A | 4/2021 |
| WO | 2010/114078 | A | 10/2010 |
| WO | WO 2018/181678 | A1 | 10/2018 |
| WO | 2019/107514 | A1 | 6/2019 |

OTHER PUBLICATIONS

Bedair et al., "*Fast, Accurate and Simple Approxinmate Analytic Formulas for Calculating the Parameters of Supported Coplanar Waveguides for (M)Mic's*," IEEE Transactions on Microwave Theory and Techniques, vol. 40, No. 1, pp. 41-48, Jan. 1, 1992.
European Office Action dated Jun. 12, 2025 (Application No. 22850701.8).
Yoshihiro Konishi, "*Base of the microwave circuit and its application*," Comprehensive Electronic Publishing, vol. 5, pp. 53-60, Apr. 25, 2000.
Shu Chen, et al., "*Complex Dielectric Permittivity Measurements of Glasses at Millimeter Waves and Terahertz Frequencies*," 2006 European Microwave Conference, pp. 384-387, DOI: 10.1109/EUMC.2006.281354, 2006.
Japanese Office Action (with English translation) dated Jan. 7, 2025 (Application No. 2022-140662).
U.S. Appl. No. 18/433,534, filed Feb. 6, 2024, Kentaro Tani.
Mutee ur Rehman et al., "W-Band and D-Band Transmission Lines on Glass Based Substrates for Sub-THz Modules," *2020 IEEE 70th Electronic Components and Technology Conference* (*ECTC*), 2020 (6 pages).
International Search Report and Written Opinion (Application No. PCT/JP2022/029939) dated Oct. 18, 2022 (10 pages).
International Search Report and Written Opinion (Application No. PCT/JP2022/029940) dated Oct. 25, 2022 (10 pages).
English translation of the International Preliminary Report on Patentability (Chapter 1) dated Feb. 22, 2024 (Application No. PCT/JP2022/029939).
Extended European Search Report, European Application No. 22850701.8, dated Sep. 13, 2024 (11 pages).
Fesharaki, et al. "Mode-Selective Transmission Line for DC-to-THz Super-Broadband Operation," *2016 IEEE MTT-S International Microwave Symposium* (*IMS*), dated May 22, 2016, pp. 1-4 (4 pages).
Tajima, et al. "Design and Analysis of LTCC-Integrated Planar Microstrip-to-Waveguide Transition at 300 GHz," *IEEE Transactions on Microwave Theory and Techniques*, IEEE, USA, vol. 64, No. 1, dated Dec. 10, 2015, pp. 106-114 (9 pages).
Kai, et al. "A Cost-Effective Transition between a Microstrip Line and a Post-Wall Waveguide Using a Laminated LTCC Substrate in 60-GHz Band," *IEICE Transactions on Electronics, Institute of Electronics*, vol. E90-C, No. 4, dated Apr. 1, 2007, pp. 907-910 (4 pages).
Chinese Office Action (with English translation) for Chinese Application No. 202280050793.0 dated Mar. 21, 2026.
David M. Posar, Microwave Engineering, 3rd Edition, Publishing House of Electronics Industry, published Jun. 30, 2015, Chapter 3, 3.11-3.11.1, pp. 132-136.
Chinese Second Office Action for Chinese Application No. 202280050791.1 dated Jun. 30, 2026.
Chinese Office Action for Chinese Application No. 202280050793.0 dated Aug. 20, 2026.

* cited by examiner

WAVEGUIDE ELEMENT

CROSS-REFERENCE TO RELATED APPLICATIONS

This application is a continuation under 35 U.S.C. 120 of International Application PCT/JP2022/029939 having the International Filing Date of 4 Aug. 2022 and having the benefit of the earlier filing dates of Japanese Application No. 2021-131757 filed on 12 Aug. 2021, Japanese Application No. 2022-085564 filed on 25 May 2022, and Japanese Application No. 2022-109198 filed on 6 Jul. 2022. Each of the identified applications is fully incorporated herein by reference.

BACKGROUND OF THE INVENTION

1. Field of the Invention

The present invention relates to a waveguide element.

2. Description of the Related Art

As an element for guiding a millimeter wave/terahertz wave, a waveguide element is being developed. The waveguide element is expected to be applied and rolled out in a wide range of fields, such as optical waveguides, next-generation high-speed communication, sensors, laser processing, and solar power generation. As an example of such waveguide element, there is a proposal of a technology involving using a microstrip antenna including: a transparent substrate having a thickness of 2 mm; an antenna conductor arranged on the transparent substrate; and a transparent conductive film arranged on a surface of the transparent substrate on an opposite side to the antenna conductor (Patent Literature 1).

However, according to such technology, there is a problem in that, when the millimeter wave/terahertz wave is guided, a propagation loss is remarkably increased.

CITATION LIST

Patent Literature

[PTL 1] WO 2019/107514 A1

SUMMARY OF THE INVENTION

A primary object of the present invention is to provide a waveguide element capable of securing excellent low-propagation loss performance, i.e., a waveguide element capable of sufficiently reducing a propagation loss, even when guiding a high-frequency electromagnetic wave having a frequency of 30 GHz or more.

[1] A waveguide element according to an embodiment of the present invention includes a waveguide member capable of guiding an electromagnetic wave having a frequency of 30 GHz or more and 20 THz or less. The waveguide member includes: an inorganic material substrate; and a conductor layer arranged above the inorganic material substrate. A thickness "t" of the inorganic material substrate satisfies the following expression (1):

$$t < \frac{\lambda}{a\sqrt{\varepsilon}} \quad (1)$$

where "t" represents the thickness of the inorganic material substrate, λ represents a wavelength of an electromagnetic wave to be guided by the waveguide member, ε represents a relative dielectric constant of the inorganic material substrate at 300 GHz, and "a" represents a numerical value of 3 or more.

[2] In the waveguide element according to the above-mentioned item [1], in the expression (1), "a" may represent a numerical value of 6 or more.

[3] In the waveguide element according to the above-mentioned item [1] or [2], the inorganic material substrate may have a relative dielectric constant & of 3.5 or more and 12.0 or less and a dielectric loss tangent (dielectric loss) tan δ of 0.003 or less at 300 GHz.

[4] In the waveguide element according to the above-mentioned item [3], the inorganic material substrate may be a quartz glass substrate.

[5] In the waveguide element according to any one of the above-mentioned items [1] to [4], the conductor layer may be coplanar-type electrodes.

[6] In the waveguide element according to the above-mentioned item [5], when the frequency of the electromagnetic wave to be propagated through the waveguide member is 30 GHz or more and 5 THz or less, the thickness of the inorganic material substrate may be 10 μm or more.

[7] In the waveguide element according to any one of the above-mentioned items [1] to [6], the thickness of the inorganic material substrate may be 31 μm or more.

[8] In the waveguide element according to any one of the above-mentioned items [1] to [7], the thickness of the inorganic material substrate may be 100 μm or less.

[9] The waveguide element according to the above-mentioned item [5] or [6] may further include a ground electrode arranged on a surface of the inorganic material substrate on an opposite side to a surface thereof on which the conductor layer is provided.

[10] In The waveguide element according to any one of the above-mentioned items [1] to [4], the conductor layer may be a microstrip-type electrode, and the waveguide element may further include a ground electrode arranged on a surface of the inorganic material substrate on an opposite side to a surface thereof on which the conductor layer is provided.

[11] The waveguide element according to any one of the above-mentioned items [1] to [10] may further include a supporting substrate, which is arranged below the waveguide member, and is configured to support the waveguide member.

[12] The waveguide element according to the above-mentioned item [5] or [6] may further include: a supporting substrate, which is arranged below the waveguide member, and is configured to support the waveguide member; and a ground electrode arranged on a surface of the supporting substrate on a side on which the waveguide member is provided.

[13] In the waveguide element according to any one of the above-mentioned items [1] to [4], the conductor layer may be a microstrip-type electrode, and the waveguide element may further include: a supporting substrate, which is arranged below the waveguide member, and which is configured to support the waveguide member; and a ground electrode arranged on a surface of the supporting substrate on a side on which the waveguide member is provided.

[14] The waveguide element according to any one of the above-mentioned items [11] to [13] may further include a back-surface conductor layer arranged on a surface of the supporting substrate on an opposite side to a surface thereof on a side on which the waveguide member is arranged.

[15] A waveguide element according to another embodiment of the present invention is capable of guiding an electromagnetic wave having a frequency of 30 GHz or more and 20 THz or less. The waveguide element includes: an inorganic material substrate; a conductor layer arranged above the inorganic material substrate; a supporting substrate positioned on an opposite side to the conductor layer with respect to the inorganic material substrate; a first metal layer positioned between the inorganic material substrate and the supporting substrate; a second metal layer positioned on an opposite side to the inorganic material substrate with respect to the supporting substrate; and a plurality of through-substrate vias configured to electrically connect the first metal layer and the second metal layer to each other. The conductor layer includes a signal electrode, which extends in a predetermined direction, and which constitutes a transmission line capable of propagating the electromagnetic wave. The first metal layer, the second metal layer, and the plurality of through-substrate vias constitute a substrate-integrated waveguide capable of propagating the electromagnetic wave. A thickness "t" of the inorganic material substrate satisfies the following expression (1):

$$t < \frac{\lambda}{a\sqrt{\varepsilon}} \tag{1}$$

where "t" represents the thickness of the inorganic material substrate, λ represents a wavelength of an electromagnetic wave to be guided by the waveguide element, ε represents a relative dielectric constant of the inorganic material substrate, and "a" represents a numerical value of 3 or more.

[16] In the waveguide element according to the above-mentioned item [15], the thickness of the inorganic material substrate may be 100 μm or less.

[17] In the waveguide element according to the above-mentioned item or [16], the thickness of the inorganic material substrate may be 31 μm or more.

[18] In the waveguide element according to any one of the above-mentioned items [15] to [17], the conductor layer may further include a ground electrode arranged at a distance from the signal electrode.

[19] The waveguide element according to the above-mentioned item [18] may further include a via configured to electrically connect the ground electrode and the first metal layer to each other.

[20] The waveguide element according to any one of the above-mentioned items [15] to [19] may further include a conductor pin configured to couple the transmission line and the substrate-integrated waveguide to each other so as to enable the electromagnetic wave to be propagated. The conductor pin penetrates through the inorganic material substrate from the signal electrode to reach the substrate-integrated waveguide in the supporting substrate.

[21] In the waveguide element according to the above-mentioned item [20], the first metal layer may have an opening into which the conductor pin is inserted, the opening forming an air layer around the conductor pin.

[22] In the waveguide element according to any one of the above-mentioned items [15] to [21], a plurality of the supporting substrates may be arranged at a distance from each other in a thickness direction of the inorganic material substrate, and the substrate-integrated waveguide may be arranged in each of the plurality of the supporting substrates.

[23] The waveguide element according to the above-mentioned item [22] may further include a spacer substrate arranged between the supporting substrates adjacent to each other out of the plurality of the supporting substrates.

[24] In the waveguide element according to any one of the above-mentioned items [15] to [23], the inorganic material substrate and the supporting substrate may be directly joined to each other via the first metal layer without an organic adhesive being present between the inorganic material substrate and the supporting substrate.

According to the embodiments of the present invention, the waveguide element capable of securing excellent low-propagation loss performance, i.e., the waveguide element capable of sufficiently reducing a propagation loss, even when guiding a high-frequency electromagnetic wave having a frequency of 30 GHz or more can be achieved.

DESCRIPTION OF THE EMBODIMENTS

Embodiments of the present invention are described below. However, the present invention is not limited to these embodiments.

A. Overall Configuration of Waveguide Element

A-1. Overall Configuration of Waveguide Element 100

Figure 1:
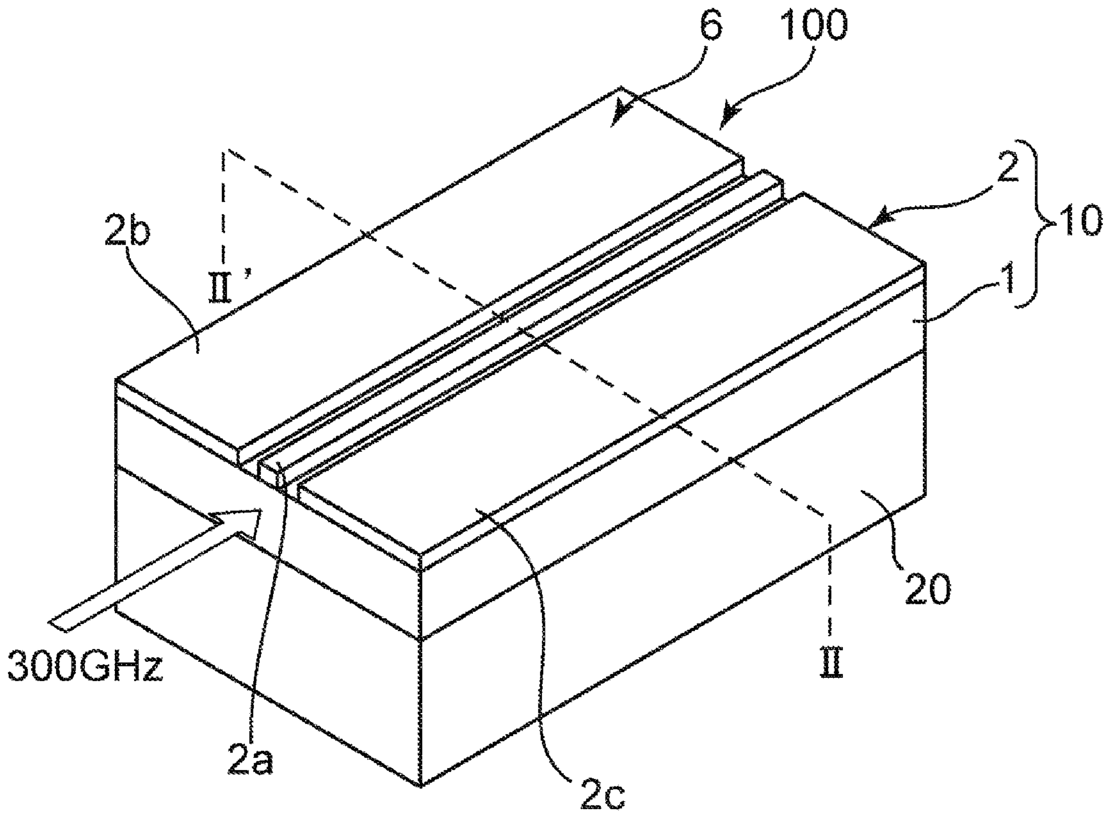
FIG. 1 is a schematic perspective view of a waveguide element according to an embodiment of the present invention.
Figure 2:
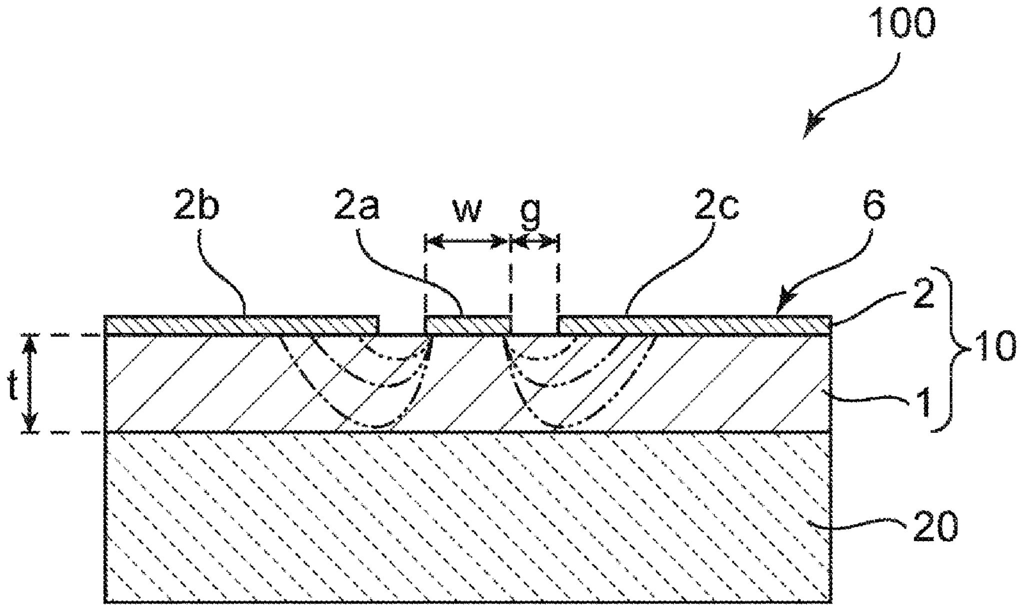
FIG. 2 is a cross-sectional view of the waveguide element taken along the line II-II' of FIG. 1.

FIG. 1 is a schematic perspective view of a waveguide element according to one embodiment of the present invention; and FIG. 2 is a cross-sectional view of the waveguide element taken along the line II-II' of FIG. 1.

A waveguide element 100 of the illustrated example includes a waveguide member 10. The waveguide member 10 is capable of guiding an electromagnetic wave having a frequency of 30 GHz or more and 20 THz or less, i.e., an electromagnetic wave that is a millimeter wave/terahertz wave. The "millimeter wave" is typically an electromagnetic wave having a frequency of from about 30 GHz to about 300 GHz; and the "terahertz wave" is typically an electromagnetic wave having a frequency of from about 300 GHz to about 20 THz.

The waveguide member 10 includes: an inorganic material substrate 1; and a conductor layer 6 arranged above the inorganic material substrate 1. The thickness of the inorganic material substrate 1 satisfies the following expression (1):

$$t < \frac{\lambda}{a\sqrt{\varepsilon}} \tag{1}$$

where "t" represents the thickness of the inorganic material substrate, λ represents the wavelength of an electromagnetic wave to be guided by the waveguide member, ε represents the relative dielectric constant of the inorganic material substrate at 300 GHZ, and "a" represents a numerical value of 3 or more.

When the thickness of the inorganic material substrate satisfies the expression (1), even in the case where the waveguide member guides the above-mentioned high-frequency electromagnetic wave, the inducement of a slab mode can be suppressed, and in a configuration in which the waveguide member is supported by a supporting substrate, the occurrence of substrate resonance can be suppressed.

Accordingly, even in the case of guiding the above-mentioned high-frequency electromagnetic wave, the waveguide element can suppress an increase in propagation loss, and can secure excellent low-propagation loss performance.

In addition, the waveguide element is being developed to be downsized, and is expected to integrate circuits in the future, and hence accompanying downsizing of the waveguide member (line structure) is predicted to be required as well. In the above-mentioned waveguide element, thinning of the inorganic material substrate included in the waveguide member (line structure) is achieved, and hence the demand for downsizing can be met while excellent low-propagation loss performance is secured.

In one embodiment, in the expression (1), "a" represents a numerical value of 6 or more.

When the thickness of the inorganic material substrate satisfies the expression (1) where "a" represents a numerical value of 6 or more, a reduction in propagation loss in the case of guiding the above-mentioned high-frequency electromagnetic wave can be stably achieved.

The relative dielectric constant & of the inorganic material substrate 1 at 300 GHz is typically 3.5 or more, and is typically 12.0 or less, preferably 10.0 or less, more preferably 5.0 or less. The relative dielectric constant of the inorganic material substrate 1 at from 100 GHz to 10 THz is, for example, 10.0 or less, preferably 3.7 or more and 10.0 or less, more preferably 3.8 or more and 9.0 or less.

The dielectric loss tangent (dielectric loss) tan δ of the inorganic material substrate 1 at 300 GHz is typically 0.0030 or less, preferably 0.0020 or less, more preferably 0.0015 or less. The dielectric loss tangent (tan δ) of the inorganic material substrate is preferably 0.01 or less, more preferably 0.008 or less, still more preferably 0.006 or less, particularly preferably 0.004 or less at the frequency to be used.

When the relative dielectric constant & and the dielectric loss tangent (dielectric loss) tan δ of the inorganic material substrate fall within the above-mentioned ranges, a reduction in propagation loss in the case of guiding the above-mentioned high-frequency electromagnetic wave (in particular, an electromagnetic wave of 300 GHz or more) can be more stably achieved. In addition, when the dielectric constant of the inorganic material substrate falls within such ranges, the delay of the electromagnetic wave to be propagated can be suppressed. When the dielectric loss tangent falls within such ranges, the propagation loss in the waveguide can be reduced. The dielectric loss tangent is preferably as small as possible. The dielectric loss tangent may be, for example, 0.001 or more.

The relative dielectric constant & and the dielectric loss tangent (dielectric loss) tan δ may be measured by terahertz time domain spectroscopy. In addition, herein, when the measurement frequency is not mentioned with regard to the relative dielectric constant and the dielectric loss tangent, the relative dielectric constant and the dielectric loss tangent at 300 GHz are meant.

The thickness of the inorganic material substrate 1 satisfying the above-mentioned expression (1) may be specifically 1 μm or more, 2 μm or more, 10 μm or more, 20 μm or more, or 31 μm or more. In addition, the thickness of the inorganic material substrate 1 may be, for example, 1,700 μm or less, 500 μm or less, 200 μm or less, or 100 μm or less. From the viewpoint of downsizing through a reduction in size of an electrode, the thickness of the inorganic material substrate 1 is preferably 80 μm or less, more preferably 60 μm or less. In addition, when the frequency of the electromagnetic wave to be propagated through the waveguide member is 30 GHz or more and 5 THz or less, the thickness of the inorganic material substrate 1 is preferably 10 μm or more. In order to secure strength, the thickness of the inorganic material substrate 1 is preferably 30 μm or more, more preferably 40 μm or more.

When the thickness of the inorganic material substrate 1 is smaller than the above-mentioned lower limits, the thickness and width of an electrode included in the waveguide element are reduced to about several micrometers, and hence the propagation loss is increased by the influence of a skin effect, and besides, a tolerance in line performance due to manufacturing variation is significantly reduced.

When the thickness of the inorganic material substrate 1 is equal to or smaller than the above-mentioned upper limits, the inducement of a slab mode and the occurrence of substrate resonance are suppressed, and hence a waveguide element having a small propagation loss over a wide frequency range (i.e., a broadband waveguide element) can be achieved.

The waveguide member 10 of the illustrated example forms a coplanar line. That is, the conductor layer 6 of the waveguide member 10 is coplanar-type electrodes 2.

The coplanar-type electrodes 2 are arranged on the upper surface of the inorganic material substrate 1. The coplanar-type electrodes 2 include a signal electrode 2*a*, a first ground electrode 2*b*, and a second ground electrode 2*c*. The signal electrode 2*a* has a line shape extending in a predetermined direction. A width w of the signal electrode 2*a* is, for example, 2 μm or more, preferably 20 μm or more, and is, for example, 200 μm or less, preferably 150 μm or less. The first ground electrode 2*b* is arranged at a distance from the signal electrode 2*a* in a direction perpendicular to the longitudinal direction of the signal electrode 2*a*. The second ground electrode 2*c* is positioned on the opposite side to the first ground electrode 2*b* with respect to the signal electrode 2*a* in the direction perpendicular to the longitudinal direction of the signal electrode 2*a*, and is arranged at a distance from the signal electrode 2*a*. Thus, a clearance (slit) extending in the longitudinal direction of the signal electrode 2*a* is formed between the signal electrode 2*a* and each of the ground electrodes 2*b* and 2*c*. A width g of the clearance (slit) is, for example, 2 μm or more, preferably 5 μm or more, and is, for example, 100 μm or less, preferably 80 μm or less.

In such coplanar line, when a voltage is applied to the coplanar-type electrodes 2, an electric field is generated between the signal electrode 2*a* and each of the ground electrodes 2*b* and 2*c*. When input into the waveguide element 100, the above-mentioned high-frequency electromagnetic wave propagates in the inorganic material substrate 1 while being coupled with the electric field generated between the signal electrode 2*a* and each of the ground electrodes 2*b* and 2*c*.

The waveguide element 100 of the illustrated example further includes a supporting substrate 20 arranged below the waveguide member 10, the supporting substrate 20 supporting the waveguide member 10.

When a waveguide element includes a supporting substrate, while the mechanical strength of the waveguide element can be enhanced, substrate resonance occurs with a thickness including the substrate to increase the propagation loss in some cases at a time when the waveguide member guides the above-mentioned high-frequency electromagnetic wave.

However, in the above-mentioned configuration, the thickness of the inorganic material substrate satisfies the expression (1), and besides, the dielectric constants of the supporting substrate and the waveguide member differ from each other, and hence, even when the waveguide member guides the above-mentioned high-frequency electromagnetic wave, the occurrence of substrate resonance can be suppressed. Accordingly, even when the waveguide element includes the supporting substrate and guides the above-mentioned high-frequency electromagnetic wave, an increase in propagation loss can be suppressed.

From this viewpoint, the difference between the dielectric constants of the waveguide member and the supporting substrate is desirably as large as possible, and the dielectric constant of the supporting substrate is desirably smaller than the dielectric constant of the waveguide member. In addition, when the dielectric constant of the supporting substrate is larger than the dielectric constant of the waveguide member, a layer having a small dielectric constant may be arranged between the waveguide member and the supporting substrate.

Further, in order to completely suppress the substrate resonance, a grounded coplanar line or a microstrip line may be adopted as described later.

The waveguide element 100 of the illustrated example includes the supporting substrate for supporting the waveguide member, but the waveguide element of the present invention may not include the supporting substrate. In other words, the waveguide element may be formed only of the waveguide member. The same applies to a waveguide element 101 and a waveguide element 102 to be described later.

A-2. Overall Configuration of Waveguide Element 101

Figure 3:
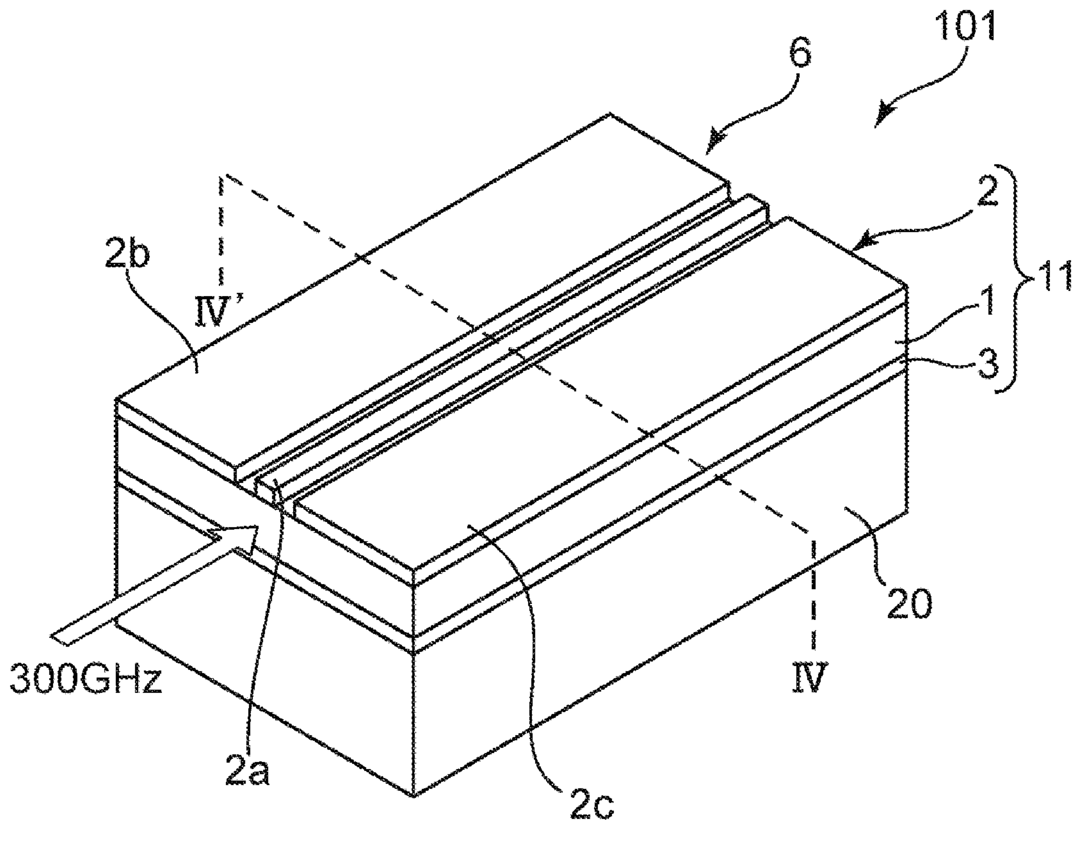
FIG. 3 is a schematic perspective view of a waveguide element according to another embodiment of the present invention.
Figure 4:
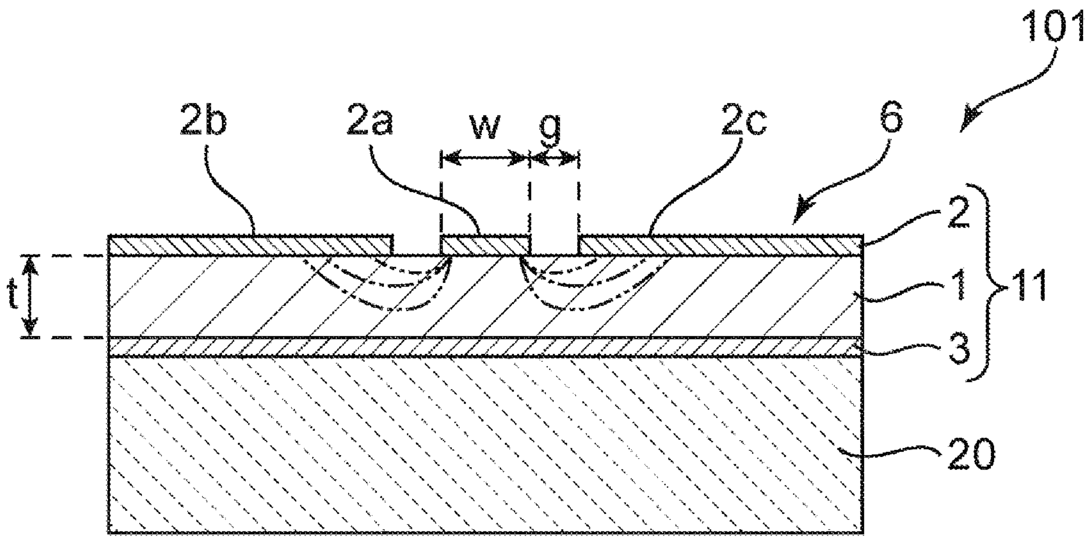
FIG. 4 is a cross-sectional view of the waveguide element taken along the line IV-IV' of FIG. 3.

FIG. 3 is a schematic perspective view of a waveguide element according to another embodiment of the present invention; and FIG. 4 is a cross-sectional view of the waveguide element taken along the line IV-IV' of FIG. 3.

In the waveguide element 101 of the illustrated example, a waveguide member 11 forms a grounded coplanar line, and includes the coplanar-type electrodes 2, the inorganic material substrate 1, and a ground electrode 3. The ground electrode 3 is positioned on the opposite side to the coplanar-type electrodes 2 with respect to the inorganic material substrate 1. In one embodiment, the ground electrode 3 is arranged on the surface of the inorganic material substrate 1 on the opposite side to the surface thereof on which the coplanar-type electrodes 2 (conductor layer 6) are formed. In the waveguide element 101 of the illustrated example, the ground electrode 3 is positioned between the inorganic material substrate 1 and the supporting substrate 20.

When the waveguide member 11 includes the ground electrode 3, the electric field to be generated between the signal electrode 2*a* and each of the ground electrodes 2*b* and 2*c* is suppressed from leaking from the inorganic material substrate 1 to the supporting substrate 20, and a reduction in propagation loss due to the occurrence of substrate resonance or stray capacitance can be suppressed.

A width w of the signal electrode 2*a* is, for example, 2 μm or more, preferably 20 μm or more, and is, for example, 300 μm or less, preferably 250 μm or less. A width g of a clearance (slit) is, for example, 2 μm or more, preferably 5 μm or more, and is, for example, 200 μm or less, preferably 150 μm or less.

Figure 7:
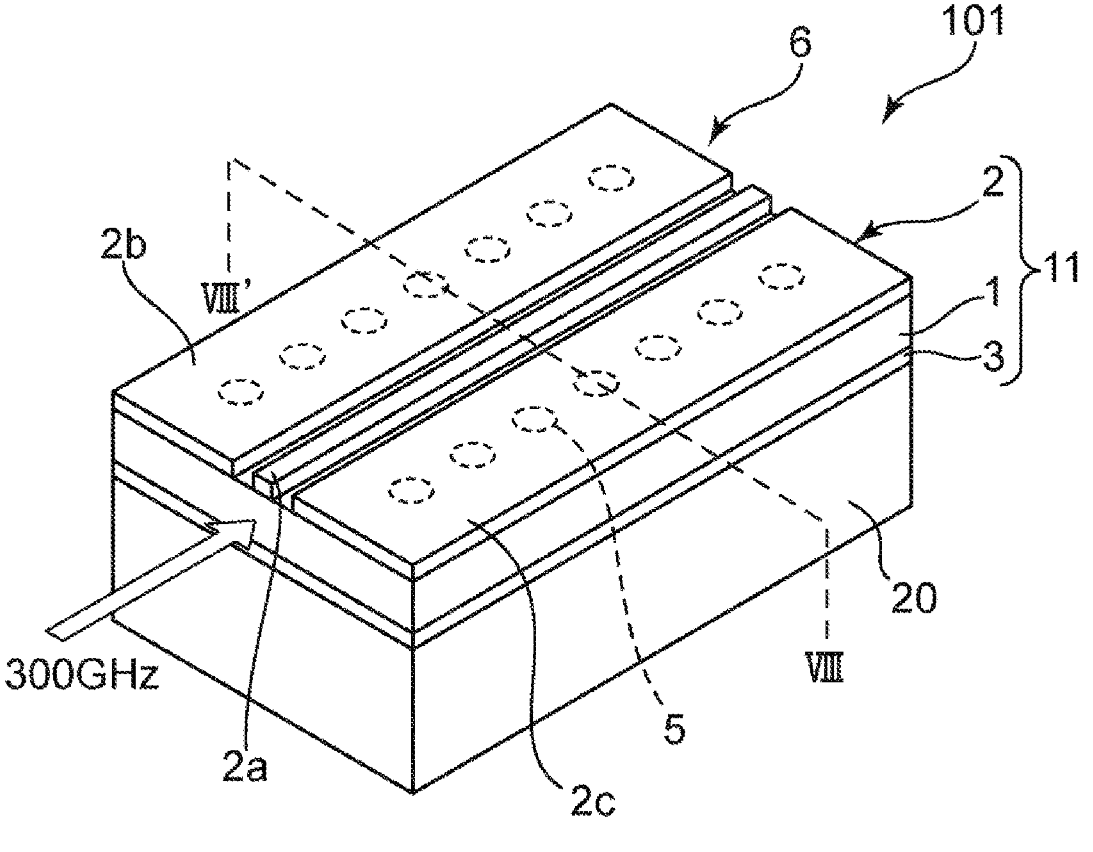
FIG. 7 is a schematic perspective view of a waveguide element according to still another embodiment of the present invention.
Figure 8:
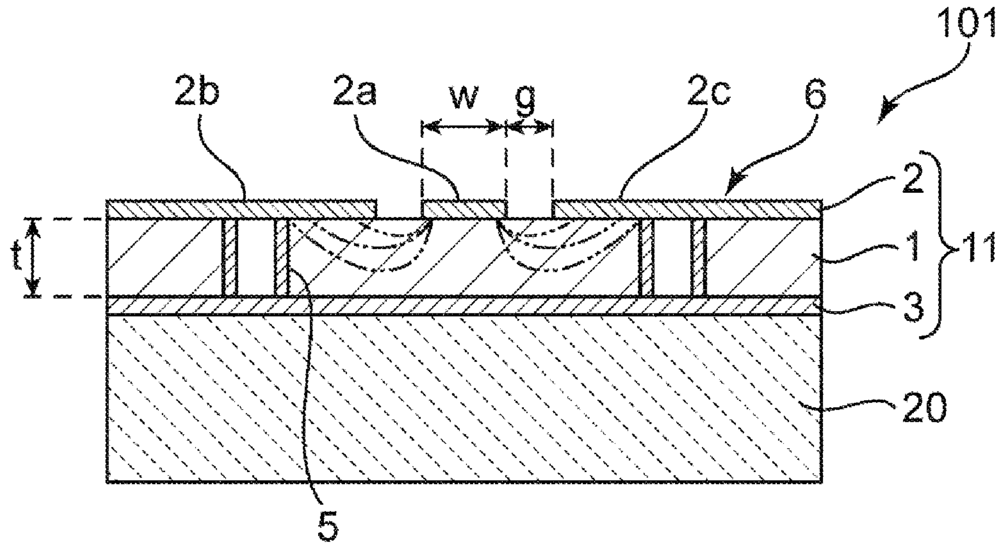
FIG. 8 is a cross-sectional view of the waveguide element taken along the line VIII-VIII' of FIG. 7.

In addition, as illustrated in FIG. 7 and FIG. 8, the ground electrodes 2*b* and 2*c* may each be conducted to the ground electrode 3. When the ground electrodes 2*b* and 2*c* are each conducted to the ground electrode 3, ground can be strengthened, and hence stray capacitance due to a line or an element in the surroundings can be suppressed.

In the illustrated example, the inorganic material substrate 1 has a plurality of via holes formed therein, and vias 5 positioned in the respective via holes short-circuit the first ground electrode 2*b* and the ground electrode 3 to each other, and the second ground electrode 2*c* and the ground electrode 3 to each other. The vias 5 for short-circuiting the first ground electrode 2*b* and the ground electrode 3 to each other, and the vias 5 for short-circuiting the second ground electrode 2*c* and the ground electrode 3 to each other are arranged at a distance from each other in a direction intersecting the longitudinal direction of the signal electrode 2*a*. The vias 5 are each typically a conductive film. The arrangement of the plurality of via holes is not particularly limited, but in the illustrated example, the plurality of via holes are arranged in the longitudinal direction of the signal electrode 2*a*.

A-3. Overall Configuration of Waveguide Element 102

Figure 5:
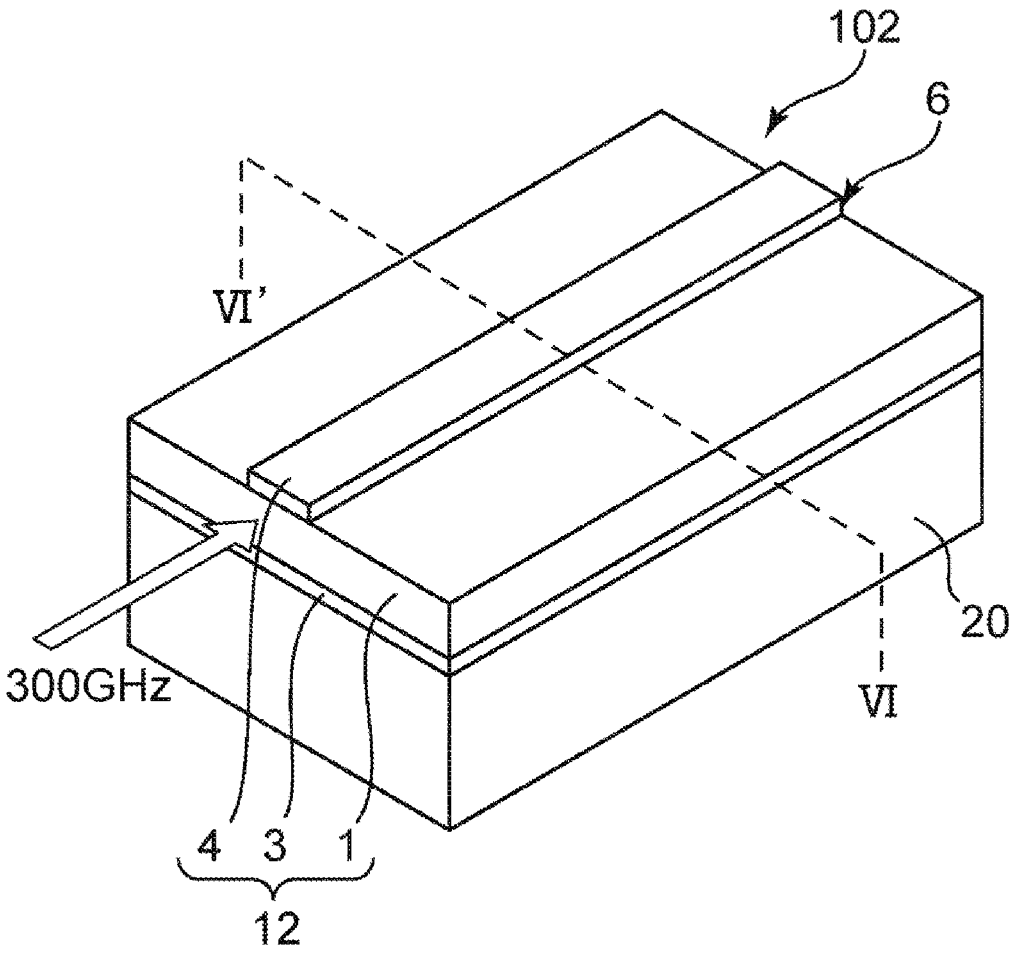
FIG. 5 is a schematic perspective view of a waveguide element according to still another embodiment of the present invention.
Figure 6:
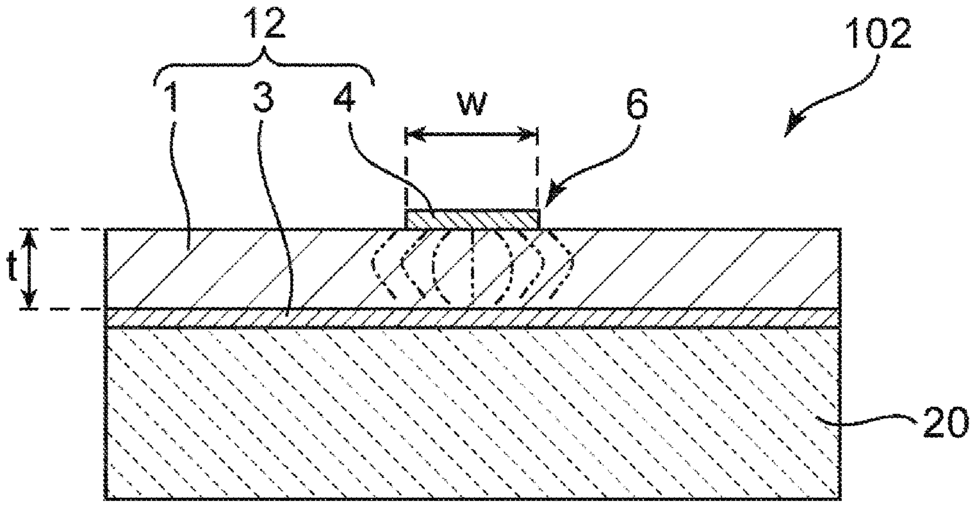
FIG. 6 is a cross-sectional view of the waveguide element taken along the line VI-VI' of FIG. 5.

FIG. 5 is a schematic perspective view of a waveguide element according to still another embodiment of the present invention; and FIG. 6 is a cross-sectional view of the waveguide element taken along the line VI-VI' of FIG. 5.

In the waveguide element 102 of the illustrated example, a waveguide member 12 forms a microstrip line, and includes a microstrip-type electrode 4 serving as the conductor layer 6, the inorganic material substrate 1, and the ground electrode 3.

The microstrip-type electrode 4 has a flat strip shape extending in a predetermined direction. A width w of the microstrip-type electrode 4 is, for example, 2 μm or more, preferably 100 μm or more, more preferably 300 μm or more, and is, for example, 800 μm or less, preferably 500 μm or less.

The ground electrode 3 is positioned on the opposite side to the microstrip-type electrode 4 with respect to the inorganic material substrate 1. In one embodiment, the ground electrode 3 is arranged on the surface of the inorganic material substrate 1 on the opposite side to the surface thereof on which the microstrip-type electrode 4 (conductor layer 6) is formed. In the waveguide element 102 of the illustrated example, the ground electrode 3 is positioned between the inorganic material substrate 1 and the supporting substrate 20.

In such microstrip-type line, when a voltage is applied to the microstrip-type electrode 4 and the ground electrode 3, an electric field is generated between the microstrip-type electrode 4 and the ground electrode 3. When input into the waveguide element 102, the above-mentioned high-frequency electromagnetic wave propagates in the inorganic material substrate 1 while being coupled with the electric field generated between the microstrip-type electrode 4 and the ground electrode 3.

A-4. Overall Configuration of Waveguide Element 103

Figure 12:
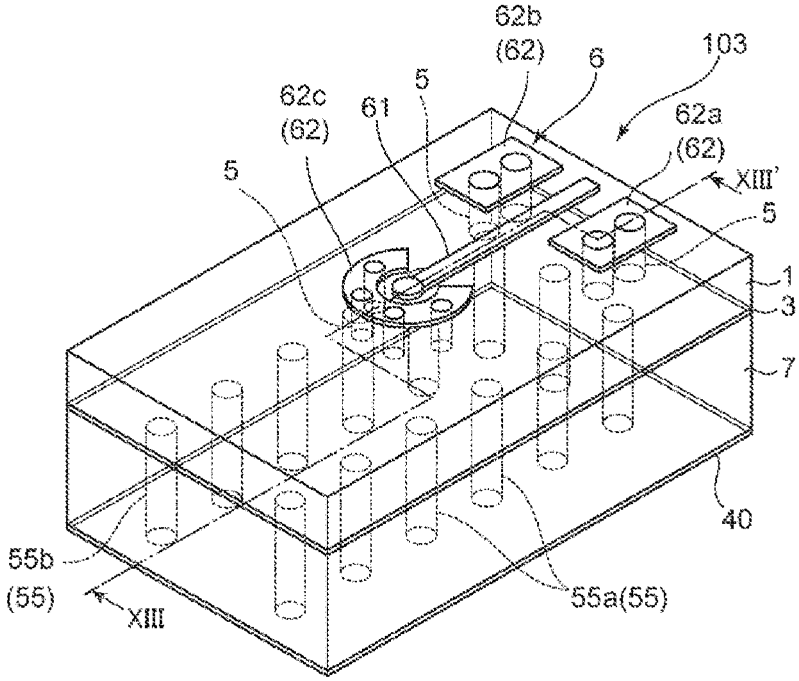
FIG. 12 is a schematic perspective view of a waveguide element according to still another embodiment of the present invention.
Figure 13:
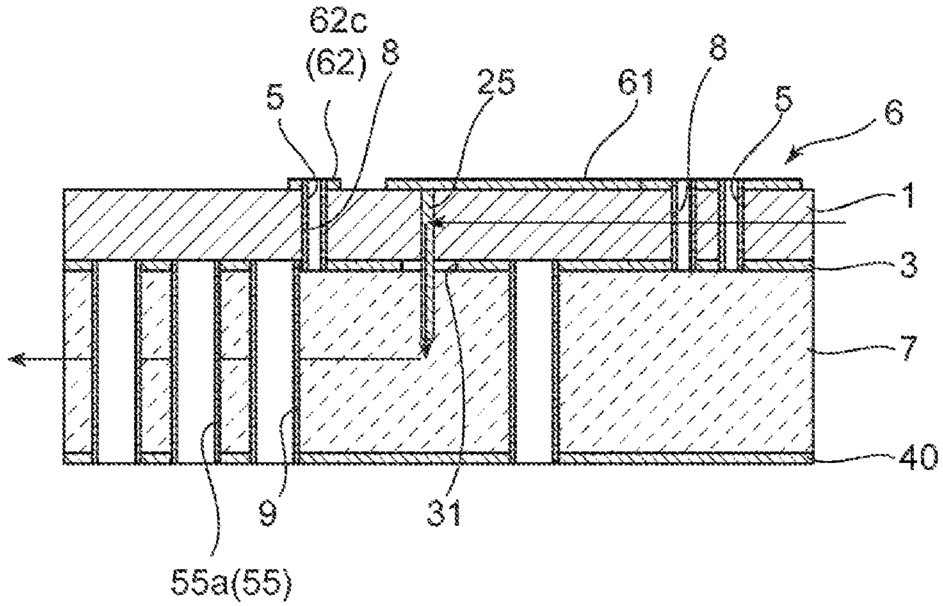
FIG. 13 is a cross-sectional view of the waveguide element taken along the line XIII-XIII' of FIG. 12.
Figure 14:
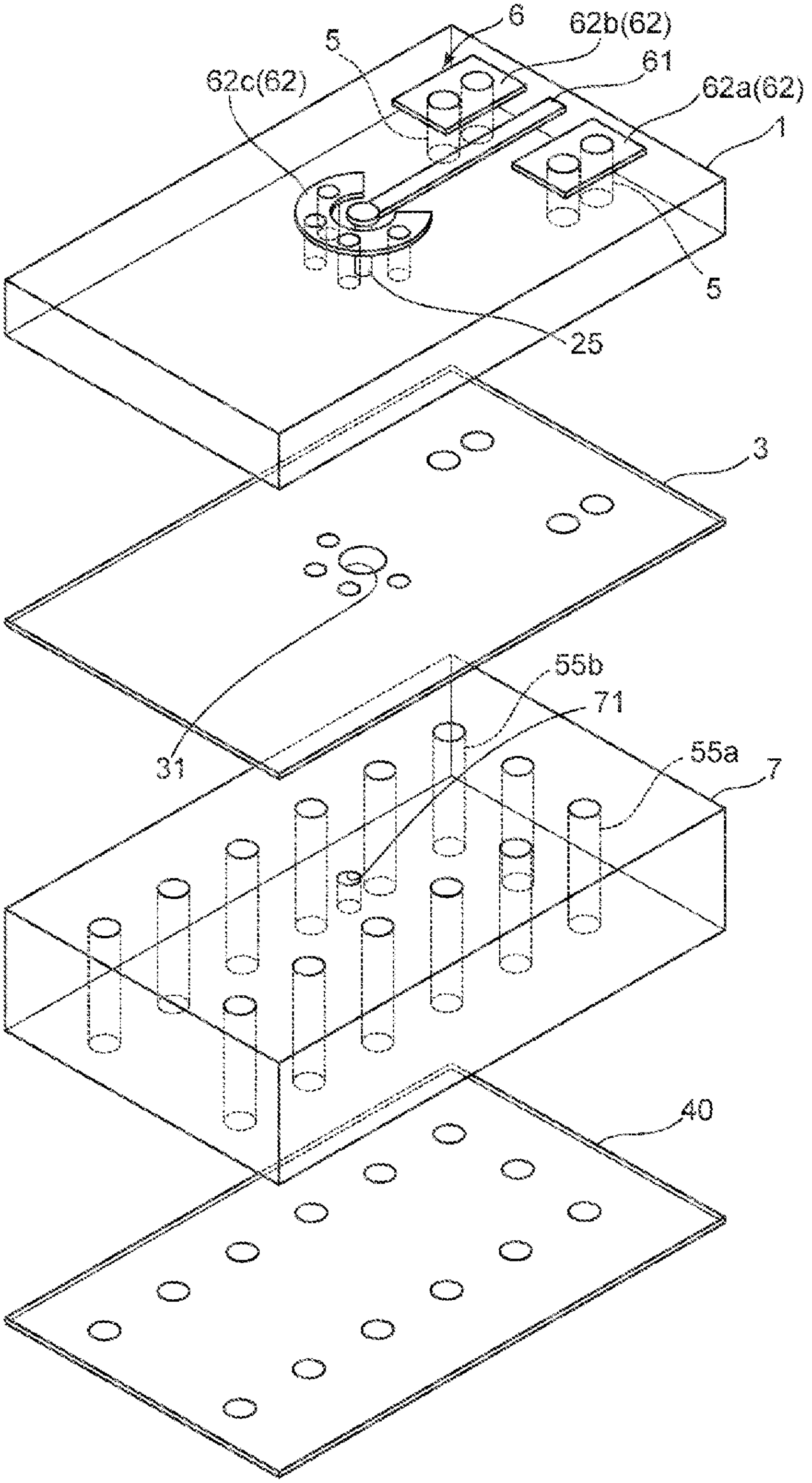
FIG. 14 is an exploded perspective view of the waveguide element of FIG. 12.

FIG. 12 is a schematic perspective view of a waveguide element according to still another embodiment of the present invention; FIG. 13 is a cross-sectional view of the waveguide element taken along the line XIII-XIII' of FIG. 12; and FIG. 14 is an exploded perspective view of the waveguide element of FIG. 12.

A waveguide element 103 of the illustrated example is capable of guiding an electromagnetic wave having a frequency of 30 GHz or more and 20 THz or less, i.e., the electromagnetic wave that is the millimeter wave/terahertz wave described above. In particular, the waveguide element 103 can guide an electromagnetic wave having a frequency of 30 GHz or more and 2 THz or less (in particular, an electromagnetic wave having a frequency of 30 GHz or more and 1 THz or less) with an excellent propagation loss.

When a waveguide element is adopted for various industrial products, mounting of the waveguide element on a supporting substrate, such as an IC substrate or a printed circuit board, is considered. However, when the waveguide element is mounted on the supporting substrate and guides the millimeter wave/terahertz wave (in particular, an electromagnetic wave of 300 GHz or more), there is a problem in that the propagation loss is remarkably increased.

In view of this, the waveguide element 103 includes: the above-mentioned inorganic material substrate 1; the conductor layer 6 including a signal electrode 61; a supporting substrate 7; a first metal layer 3; a second metal layer 40; and a plurality of through-substrate vias 55.

The conductor layer 6 is arranged above the inorganic material substrate 1 (more specifically on the upper surface thereof). The signal electrode 61 extends in a predetermined direction (waveguide direction). The signal electrode 61 forms a transmission line capable of propagating the above-mentioned electromagnetic wave. The supporting substrate 7 is positioned on the opposite side to the conductor layer 6 with respect to the inorganic material substrate 1. The first metal layer 3 is positioned between the inorganic material substrate 1 and the supporting substrate 7. The second metal layer 40 is positioned on the opposite side to the first metal layer 3 with respect to the supporting substrate 7. Each of the plurality of through-substrate vias 55 electrically connects the first metal layer 3 and the second metal layer 40. The first metal layer 3, the second metal layer 40, and the plurality of through-substrate vias 55 form a substrate-integrated waveguide (SIW) capable of propagating an electromagnetic wave. The thickness "t" of the inorganic material substrate 1 satisfies the above-mentioned expression (1).

In the waveguide element including the signal electrode described above, a high-frequency electromagnetic wave is propagated through the transmission line in the inorganic material substrate. According to the above-mentioned configuration, the thickness of the inorganic material substrate satisfies the expression (1), and hence, even when the waveguide element guides a high-frequency electromagnetic wave, the inducement of a slab mode and/or the occurrence of substrate resonance can be suppressed. In addition, the first metal layer is arranged between the inorganic material substrate and the supporting substrate, and the second metal layer is arranged on the opposite side to the first metal layer with respect to the supporting substrate, and hence the leakage of the electromagnetic wave to the supporting substrate can be suppressed. Accordingly, while the inducement of a slab mode and/or the occurrence of substrate resonance can be suppressed, the leakage of the electromagnetic wave to the supporting substrate can be suppressed. As a result, even when a high-frequency electromagnetic wave having a frequency of 30 GHz or more is guided in the waveguide element, the propagation loss can be sufficiently reduced.

Further, the first metal layer and the second metal layer form a substrate-integrated waveguide (hereinafter referred to as "SIW") together with the plurality of through-substrate vias. Thus, the SIW can be arranged in the supporting substrate, and hence the supporting substrate can be effectively utilized as a waveguide.

As described above, the waveguide element is expected to integrate circuits in the future. In the above-mentioned waveguide element, thinning of the inorganic material substrate is achieved, and besides, the transmission line formed by the signal electrode and the SIW can be efficiently arranged, and hence the demand for downsizing can be met while excellent propagation loss performance is secured.

The signal electrode 61 of the illustrated example forms a microstrip line serving as an example of the transmission line together with the first metal layer 3. That is, the signal electrode 61 and the first metal layer 3 are microstrip-type electrodes. When the signal electrode and the first metal layer are microstrip-type electrodes, the above-mentioned high-frequency electromagnetic wave propagates in the inorganic material substrate 1 while being coupled with an electric field generated between the signal electrode 61 and the first metal layer 3.

In one embodiment, the conductor layer 6 further includes ground electrodes 62 arranged at a distance from the signal electrode 61. In the illustrated example, the conductor layer 6 includes a first ground electrode 62*a*, a second ground electrode 62*b*, and a third ground electrode 62*c*.

The first ground electrode 62*a* and the second ground electrode 62*b* are arranged at a distance from each other in a direction intersecting (preferably perpendicular to) the longitudinal direction of the signal electrode 61. One end portion of the signal electrode 61 is positioned between the first ground electrode 62*a* and the second ground electrode 62*b*. A predetermined clearance (gap) is formed between the signal electrode 61 and each of the first ground electrode 62*a* and the second ground electrode 62*b*. The first ground electrode 62*a* and the second ground electrode 62*b* may be electrically connectable to an external element (not shown). The third ground electrode 62*c* is arranged at a predetermined distance from the other end portion of the signal electrode 61. A predetermined clearance (gap) is formed between the signal electrode 61 and the third ground electrode 62*c*. The third ground electrode 62*c* has an approximately C-shape when viewed from the thickness direction of the inorganic material substrate 1, and surrounds the other end portion of the signal electrode 61. The conductor layer 6 may not include the third ground electrode 62*c*. In addition, the signal electrode 61 may form coplanar-type electrodes (not shown) serving as an example of the transmission line together with the first ground electrode 62*a* and the second ground electrode 62*b*.

In one embodiment, the waveguide element 103 further includes vias 5 configured to electrically connect the ground electrode 62 and the first metal layer 3 to each other. Thus, ground can be strengthened, and hence stray capacitance due to a line or an element in the surroundings can be suppressed. In the illustrated example, each of the first ground electrode 62*a*, the second ground electrode 62*b*, and the third ground electrode 62*c* is electrically connected to the first metal layer 3 by a plurality of the vias 5.

The vias 5 are each formed of a conductor material, and are each typically formed of a metal (described later) similar to that of the conductor layer 6. The vias 5 are each arranged in a first via hole 8 (see FIG. 13). That is, the waveguide element 103 has a plurality of the first via holes 8 in correspondence to the plurality of vias 5. In the illustrated example, the first via holes 8 penetrate through the ground electrodes 62, the inorganic material substrate 1, and the first metal layer 3 collectively. The vias 5 are each typically a conductive film formed over the entire inner surface of the via hole 8. The first via holes may penetrate through only the inorganic material substrate without penetrating through the ground electrodes and the first metal layer. In this case, the vias are caused to fill the first via holes in such a manner as to be brought into contact with the ground electrodes and the first metal layer. The entire inside of each of the first via holes 8 may be filled with a conductive material. When the vias 5 are each formed of a conductor film, the inside thereof may be filled with a conductive material. The conductive material may be the same metal as that of each of the vias 5, or may be a different material such as a conductive paste.

The plurality of through-substrate vias 55 each penetrate through the supporting substrate 7 in its thickness direction, and are periodically arranged in the supporting substrate 7. The plurality of through-substrate vias 55 typically include a first via row 55*a* and a second via row 55*b*. Each of the first via row 55*a* and the second via row 55*b* is formed of a plurality of through-substrate vias 55 arranged at a distance from each other in a predetermined direction. The second via row 55*b* is positioned away from the first via row 55*a* in a direction perpendicular to the direction in which the first via row 55*a* extends. In one embodiment, an area in the supporting substrate 7 surrounded by the first metal layer 3, the second metal layer 40, the first via row 55*a*, and the second via row 55*b* functions as the SIW.

The through-substrate vias 55 are each formed of a conductor material, and are each typically formed of a metal (described later) similar to that of the conductor layer 6. The through-substrate vias 55 are each arranged in a second via hole 9 (see FIG. 13). That is, the waveguide element 103 has a plurality of the second via holes 9 in correspondence to the plurality of through-substrate vias 55. In the illustrated example, the second via holes 9 penetrate through the first metal layer 3, the supporting substrate 7, and the second metal layer 40 collectively. The through-substrate vias 55 are each typically a conductive film formed over the entire inner surface of the second via hole 9. The second via holes may penetrate through only the supporting substrate without penetrating through the first metal layer and the second metal layer. In this case, the through-substrate vias are caused to fill the second via holes in such a manner as to be brought into contact with the first metal layer and the second metal layer. In addition, when the through-substrate vias 55 for conducting the first metal layer 3 and the second metal layer 40 to each other are each formed of a conductor film, the inside thereof may be filled with a material such as a resin.

In the waveguide element 103, the transmission line formed by the signal electrode 61 and the SIW may be independent of each other, or may be coupled to each other so as to enable an electromagnetic wave to be propagated. In one embodiment, as illustrated in FIG. 13, the transmission line (typically a microstrip-type transmission line) formed by the signal electrode 61 and the SIW are coupled to each other by a conductor pin 25. Thus, the propagation mode of the electromagnetic wave can be converted between a transmission line mode and a waveguide mode. For example, an electromagnetic wave (signal) in the transmission line mode propagating through the inorganic material substrate can be converted via the conductor pin into an electromagnetic wave in the waveguide mode propagating through the supporting substrate. The supporting substrate may function as an antenna for spatially radiating the electromagnetic wave propagating in the waveguide mode in the in-plane direction of the substrate.

The conductor pin 25 penetrates through the inorganic material substrate 1 from the signal electrode 61 to reach the SIW in the supporting substrate 7. The conductor pin 25 may serve as a propagation medium for an electromagnetic wave. The conductor pin 25 is formed of a conductor material, and is typically formed of a metal (described later) similar to that of the conductor layer 6. In the illustrated example, the conductor pin 25 extends in the thickness direction of the inorganic material substrate 1. The conductor pin 25 may have a pillar shape such as a columnar shape, or may have a tubular shape (hollow shape) such as a cylindrical shape. The base end portion of the conductor pin 25 is connected to an end portion of the signal electrode 61. The free end portion of the conductor pin 25 is inserted into a recess 71 formed in the supporting substrate 7 (see FIG. 14). The recess 71 is positioned between the first via row 55*a* and the second via row 55*b*. The portion of the conductor pin 25 between the base end portion and the free end portion is inserted into an opening 31 that the first metal layer 3 has.

The conductor pin 25 is preferably insulated from the first metal layer 3. In one embodiment, as illustrated in FIG. 13, the opening 31 forms an air layer around the conductor pin 25. The opening 31 is larger than the contour of the conductor pin 25, and the entire periphery of the opening 31 is away from the conductor pin 25. Thus, the conductor pin can be insulated from the first metal layer, and by extension, the signal electrode and the first metal layer can be stably insulated. In addition, substrate resonance due to the leakage of an electric field to the supporting substrate can be still further suppressed. Further, the influence of the dielectric loss can be suppressed as compared to a structure in which the air layer is filled with a resin.

Figure 15:
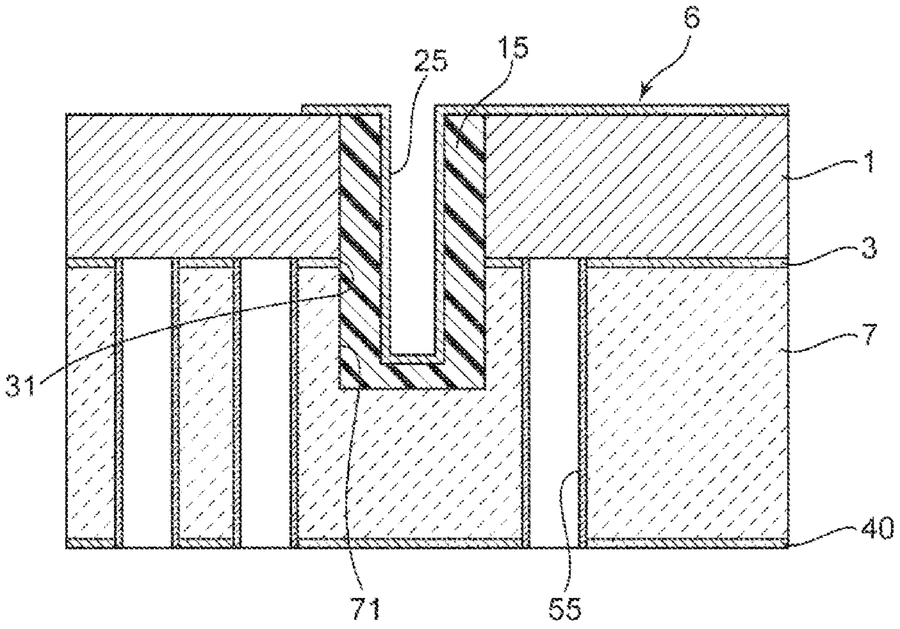
FIG. 15 is a schematic cross-sectional view of a state in which a conductor pin of FIG. 13 is covered with an insulating material.

As illustrated in FIG. 15, the periphery of the conductor pin 25 may be covered with an insulating material 15. Also in this case, the conductor pin can be insulated from the first metal layer. Examples of the insulating material include a resin and $SiO_2$.

A-5. Overall Configuration of Waveguide Element 104

Figure 16:
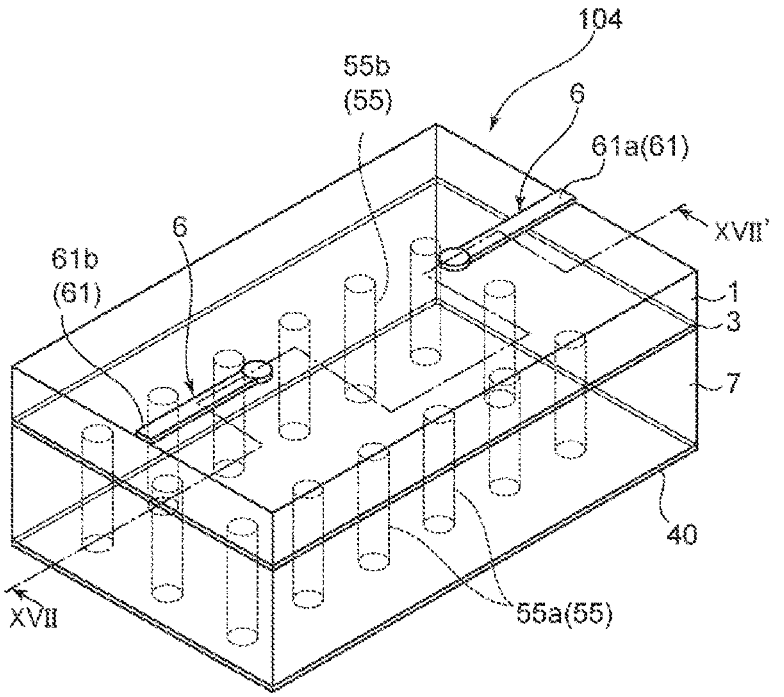
FIG. 16 is a schematic perspective view of a waveguide element according to still another embodiment of the present invention.
Figure 17:
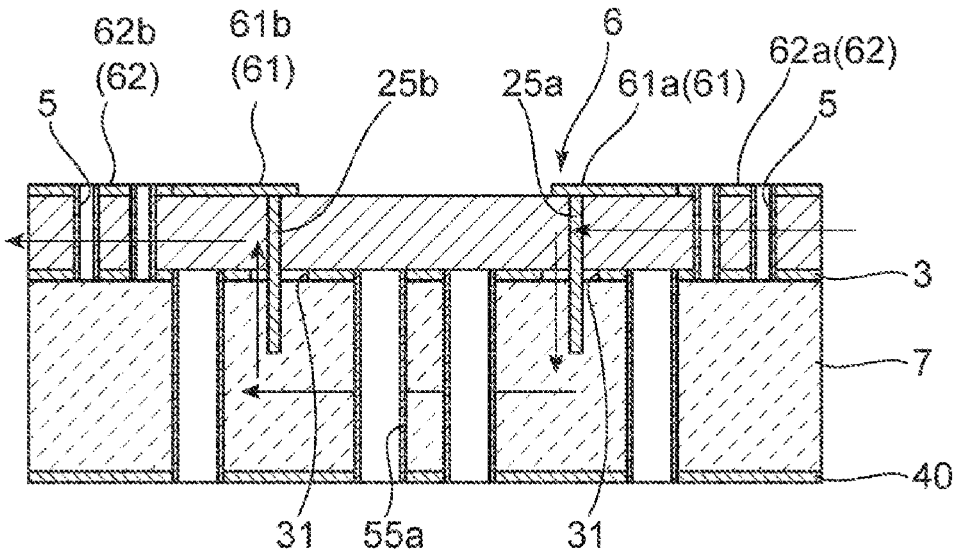
FIG. 17 is a cross-sectional view of the waveguide element taken along the line XVII-XVII' of FIG. 16.

FIG. 16 is a schematic perspective view of a waveguide element according to still another embodiment of the present invention; and FIG. 17 is a cross-sectional view of the waveguide element taken along the line XVII-XVII' of FIG. 16. In FIG. 16, the ground electrode and the vias are omitted for convenience.

The above-mentioned waveguide element 103 includes one signal electrode 61, but the number of the signal electrodes 61 is not particularly limited. A waveguide element 104 includes a plurality of the signal electrodes 61 positioned away from each other. Accordingly, the waveguide element 104 includes a plurality of transmission lines corresponding to the signal electrodes. In the illustrated example, the waveguide element 104 includes: the conductor layer 6 including a first signal electrode 61*a* and a second signal electrode 61*b*; a first conductor pin 25*a*; and a second conductor pin 25*b*. The first signal electrode 61*a* forms a first transmission line together with the first metal layer 3, and the second signal electrode 61*b* forms a second transmission line together with the first metal layer 3. The first conductor pin 25*a* couples the SIW formed of the first metal layer 3, the second metal layer 40, and the plurality of through-substrate vias 55 to the first transmission line. The second conductor pin 25*b* couples the SIW formed of the first metal layer 3, the second metal layer 40, and the plurality of through-substrate vias 55 to the second transmission line.

Thus, in one embodiment, an electromagnetic wave (signal) in the transmission line mode propagating through the inorganic material substrate can be converted into the SIW mode via the first conductor pin, then propagated through the supporting substrate in the SIW mode, and then converted via the second conductor pin again into the transmission line mode propagating through the inorganic material substrate. In this embodiment, the electromagnetic wave that has propagated through the inorganic material substrate may be emitted from an antenna element arranged on the inorganic material substrate.

A-6. Overall Configuration of Waveguide Element 105

Figure 18:
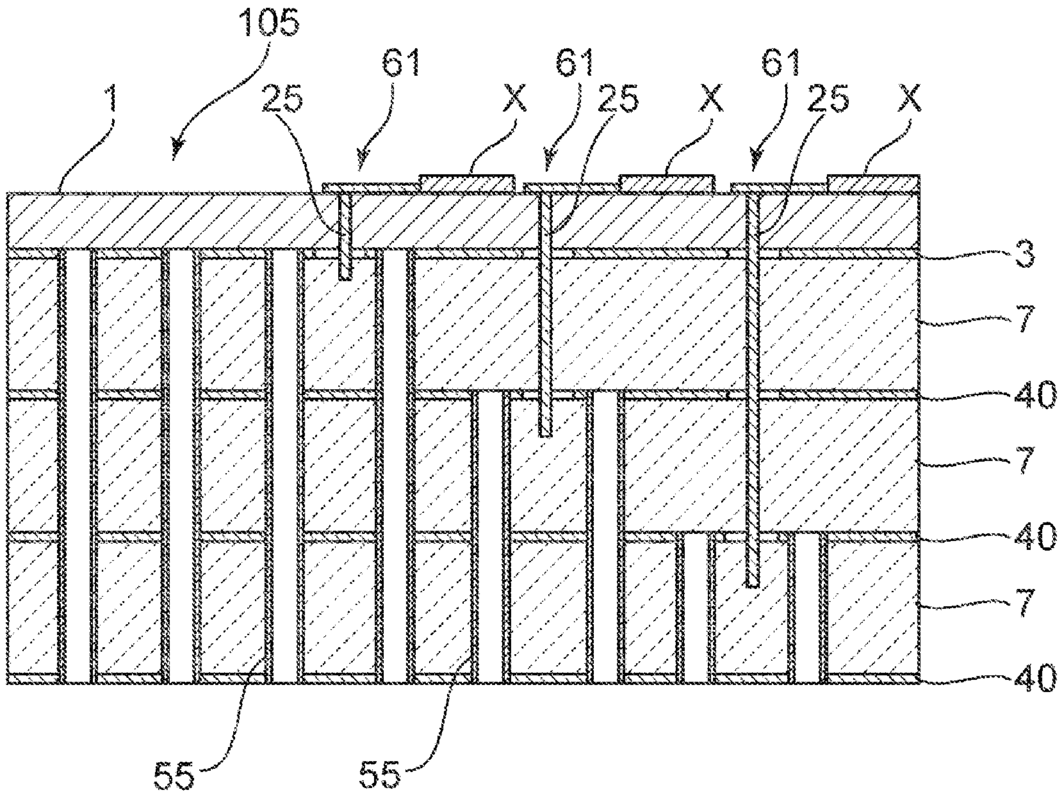
FIG. 18 is a schematic cross-sectional view of a waveguide element according to still another embodiment of the present invention.
Figure 19:
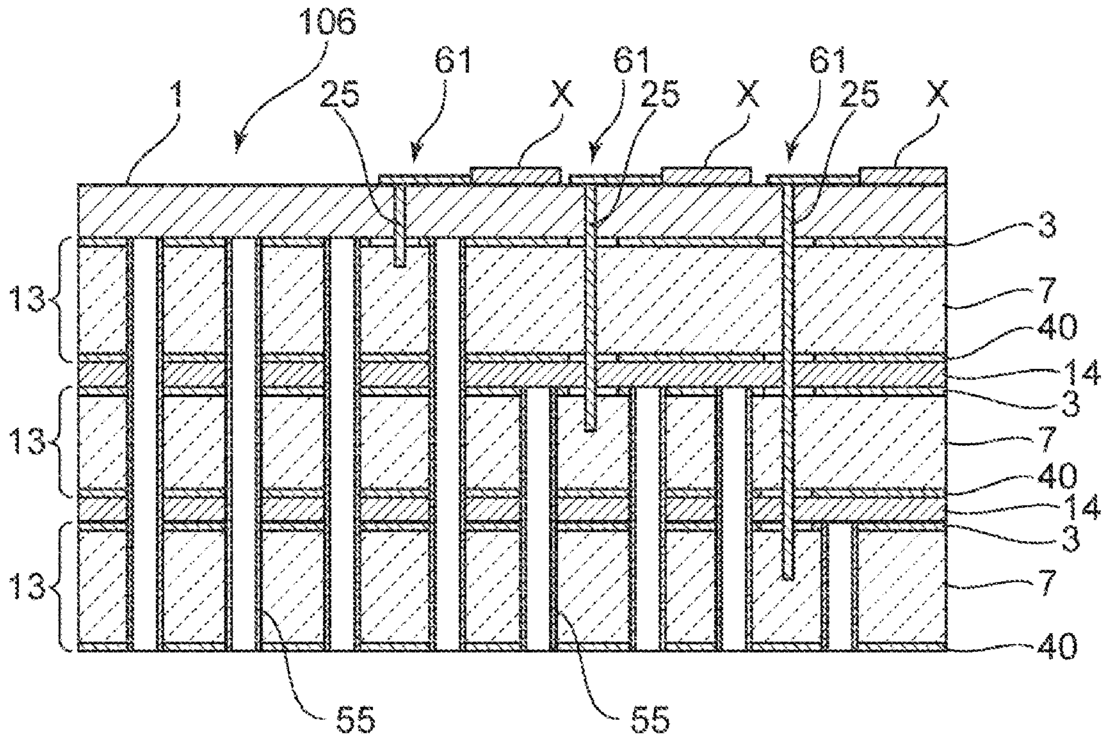
FIG. 19 is a schematic cross-sectional view of a waveguide element according to still another embodiment of the present invention.

FIG. 18 and FIG. 19 are each a schematic cross-sectional view of a waveguide element according to still another embodiment of the present invention.

The above-mentioned waveguide element 103 and waveguide element 104 each include one supporting substrate 7, but the number of the supporting substrates 7 is not particularly limited. In each of a waveguide element 105 and a waveguide element 106, a plurality of the supporting substrates 7 are arranged at a distance from each other in the thickness direction of the inorganic material substrate 1, and a substrate-integrated waveguide (SIW) is arranged in each of the plurality of supporting substrates 7. According to such configuration, antenna portions for radiating electromagnetic waves in the SIW mode can be arrayed in the thickness direction. Accordingly, such waveguide element can be used as a phased array antenna in wireless communications. When a plurality of substrates each of which transmits a signal (electromagnetic wave) are integrated, heat generation of the waveguide element becomes a problem in some cases. In the above-mentioned embodiment, however, the through-substrate vias that penetrate through the supporting substrate are connected to the metal layers, and hence heat can be smoothly dissipated from the waveguide element.

As illustrated in FIG. 18, in the waveguide element 105, the second metal layer 40 is arranged between the supporting substrates 7 adjacent to each other out of the plurality of supporting substrates 7. Thus, the SIW to be arranged in each of the supporting substrates 7 is formed by the metal layers arranged on both sides of the supporting substrate 7 (i.e., the first metal layer 3 and the second metal layer 40, or two second metal layers 40) and the plurality of through-substrate vias 55 that penetrate through the supporting substrate 7.

As illustrated in FIG. 19, in the waveguide element 106, a plurality of waveguide units 13 each including a SIW are arranged at a distance from each other in the thickness direction of the inorganic material substrate 1. Each of the plurality of waveguide units 13 includes the first metal layer 3, the supporting substrate 7, the second metal layer 40, and the plurality of through-substrate vias 55.

A spacer substrate 14 may be arranged between the supporting substrates 7 adjacent to each other out of the plurality of supporting substrates 7. In one embodiment, the spacer substrate 14 is arranged between the waveguide units 13 adjacent to each other. Through the arrangement of the spacer substrate, a distance between antenna portions in the plurality of supporting substrates can be adjusted. In particular, when the distance between the plurality of antenna portions is adjusted to $\lambda/2$, the radiation angle of an electromagnetic wave can be sufficiently scanned. As a material for the spacer substrate, there is typically given an inorganic material (described later) similar to that for the inorganic material substrate.

In addition, the waveguide element including the plurality of SIWs preferably includes the signal electrodes 61 and the conductor pins 25 in the same numbers as that of the SIWs. The respective conductor pins 25 couple transmission paths formed by the respective signal electrodes 61 to the corresponding SIWs. The conductor pin 25 penetrates through the inorganic material substrate 1 from the corresponding signal electrode 61, is inserted into the opening 31 of the first metal layer 3, and as required, further penetrates through the supporting substrate 7, the second metal layer 40, and the spacer substrate 14, to reach the target supporting substrate 7. According to such configuration, while the waveguide element can be relatively easily produced, signals (electromagnetic waves) from external signal sources X arranged on the inorganic material substrate can be easily propagated to the SIW of each supporting substrate.

As used herein, the term "waveguide element" encompasses both of a wafer having formed thereon at least one waveguide element (waveguide element wafer) and a chip obtained by cutting the waveguide element wafer.

Specific configurations of the components of the waveguide element are described in the section B to the section F below.

B. Inorganic Material Substrate

The inorganic material substrate 1 has an upper surface on which the conductor layer 6 is arranged, and a lower surface positioned inside a composite substrate.

The inorganic material substrate 1 is formed of an inorganic material. Any appropriate material may be used as the inorganic material as long as the effects according to the embodiments of the present invention are obtained. Typical examples of such material include monocrystalline quartz (relative dielectric constant: 4.5, dielectric loss tangent: 0.0013), amorphous quartz (quartz glass, relative dielectric constant: 3.8, dielectric loss tangent: 0.0010), spinel (relative dielectric constant: 8.3, dielectric loss tangent: 0.0020), AlN (relative dielectric constant: 8.5, dielectric loss tangent: 0.0015), sapphire (relative dielectric constant: 9.4, dielectric loss tangent: 0.0030), SiC (relative dielectric constant: 9.8, dielectric loss tangent: 0.0022), magnesium oxide (relative dielectric constant: 10.0, dielectric loss tangent: 0.0012), and silicon (relative dielectric constant: 11.7, dielectric loss tangent: 0.0016) (The relative dielectric constants and the dielectric loss tangents in parentheses each represent a numerical value at a frequency of 300 GHz.).

The inorganic material substrate 1 is preferably a quartz glass substrate formed of amorphous quartz.

When the inorganic material substrate 1 is a quartz glass substrate, even in the case of guiding the above-mentioned high-frequency electromagnetic wave, an increase in propagation loss can be still more stably suppressed. Further, the quartz glass substrate has a large dielectric constant as compared to a resin-based substrate, and hence can be reduced in substrate size, and besides, has a relatively small dielectric constant among inorganic materials, and hence is advantageous in achieving a low delay.

In addition, quartz glass has a small dielectric loss (tan δ), and further has the following feature unlike the resin-based substrate: a conductor layer (metal layer) for forming a line can be formed without surface roughening or surface treatment. Accordingly, the propagation loss can be further reduced.

The resistivity of the inorganic material substrate 1 is, for example, 100 kΩ·cm or more, preferably 300 kΩ·cm or more, more preferably 500 kΩ·cm or more, still more preferably 700 kΩ·cm or more. When the resistivity falls within such ranges, an electromagnetic wave can propagate in the material with a low loss without influencing electronic conduction. This phenomenon is not clear in detail, but it may be presumed that, when the resistivity is small, the electromagnetic wave couples with an electron, and hence the energy of the electromagnetic wave is consumed by electronic conduction, resulting in a loss. From this viewpoint, the resistivity is preferably as large as possible. The resistivity may be, for example, 3,000 kΩ (3 MΩ)·cm or less.

The bending strength of the inorganic material substrate 1 is, for example, 50 MPa or more, preferably 60 MPa or more. When the bending strength falls within such ranges, the substrate is hardly deformed, and hence a waveguide element with little changes in characteristics can be achieved. The bending strength is preferably as large as possible. The bending strength may be, for example, 700 MPa or less. The bending strength may be measured in conformity with the JIS standard R1601.

The thermal expansion coefficient (linear expansion coefficient) of the inorganic material substrate 1 is, for example, $10\times10^{-6}$/K or less, preferably $8\times10^{-6}$/K or less. When the thermal expansion coefficient falls within such ranges, thermal deformation (typically, warpage) of the substrate can be satisfactorily suppressed. The thermal expansion coefficient may be measured in conformity with the JIS standard R1618.

In addition, as described above, the dielectric loss tangent tan δ in the inorganic material substrate 1 is preferably as small as possible. A method of reducing the dielectric loss tangent (tan δ) of the inorganic material substrate 1 in the 300 GHz band involves, for example, reducing the OH group concentration in the inorganic material substrate. When the waveguide element guides an electromagnetic wave having a frequency of from 250 GHz to 350 GHz, the OH group concentration in the inorganic material substrate is, for example, 100 wtppm or less, preferably 15 wtppm or less, more preferably 10 wtppm or less. The OH group concentration in the inorganic material substrate may be typically 0 wtppm or more. The OH group concentration may be measured by Fourier transform infrared spectroscopy (FTIR), Raman scattering spectroscopy, or the Karl Fischer method.

In addition, the dielectric loss of the inorganic material substrate 1 may be evaluated in terms of FQ value. The FQ value is calculated as the product of the reciprocal of the dielectric loss tangent (tan δ) and the frequency of the electromagnetic wave guided by the waveguide element 103.

In the case where the OH group concentration of the inorganic material substrate 1 is 100 wtppm or less, when the frequency of the electromagnetic wave is 150 GHz or more and less than 250 GHZ, the FQ value is preferably 45,000 GHz or more, and when the frequency of the electromagnetic wave is a frequency of 250 GHz or more and less than 350 GHz, the FQ value is preferably 75,000 GHz or more.

In addition, in the case where the OH group concentration of the inorganic material substrate 1 is 15 wtppm or less, when the frequency of the electromagnetic wave is 150 GHz or more and less than 250 GHz, the FQ value is preferably 75,000 GHz or more, and when the frequency of the electromagnetic wave is 250 GHz or more and less than 350 GHz, the FQ value is preferably 105,000 GHz or more.

Further, in the case where the OH group concentration of the inorganic material substrate 1 is 10 wtppm or less, when the frequency of the electromagnetic wave is 150 GHz or more and less than 250 GHz, the FO value is preferably 150,000 GHz or more, and is typically 270,000 GHz or less, and when the frequency of the electromagnetic wave is a frequency of 250 GHz or more and less than 350 GHz, the FQ value is preferably 250,000 GHz or more, and is typically 390,000 GHz or less.

The porosity of the inorganic material substrate 1 is, for example, 0.5 ppm or more and 3,000 ppm or less, preferably from 0.5 ppm or more and 1,000 ppm or less, more preferably from 0.5 ppm or more and 100 ppm or less for pores each having a pore size of 1 μm or more. When the porosity falls within such ranges, densification is possible, and hence a waveguide element stable from both the viewpoints of mechanical strength and long-term reliability can be achieved. When the porosity is more than 3,000 ppm, the propagation loss in the waveguide is increased in some cases. It is difficult to set the porosity to less than 0.5 ppm in a technology using an inorganic material substrate.

The size of a pore refers to the following: its diameter when the pore has an approximately spherical shape; its diameter as viewed in plan view when the pore has an approximately columnar shape; and the diameter of a circle inscribed in the pore when the pore has any other shape. The presence or absence of pores may be recognized, for example, by optical computed tomography (CT) or with a transmittance-measuring instrument. The sizes of the pores may be measured with, for example, a scanning electron microscope (SEM).

C. Conductor Layer and Ground Electrode

In one embodiment, the conductor layer 6 is formed on the front surface of the inorganic material substrate 1 (one surface in its thickness direction), and is brought into direct contact with the inorganic material substrate 1.

The conductor layer 6 is typically formed of a metal. Examples of the metal include chromium (Cr), nickel (Ni), copper (Cu), gold (Au), silver (Ag), palladium (Pd), and titanium (Ti). The metals may be used alone or in combination thereof. The conductor layer 6 may be a single layer, or may be formed as a laminate of two or more layers. The conductor layer 6 is formed on the inorganic material substrate 1 by, for example, plating, sputtering, vapor deposition, or printing.

In the waveguide element 103 illustrated in FIG. 12, the conductor layer 6 is positioned on the opposite side to the first metal layer 3 with respect to the inorganic material substrate 1, and is arranged on the front surface of the inorganic material substrate 1. The conductor layer 6 includes at least the signal electrode 61. The range of the width of the signal electrode 61 (dimension in a direction perpendicular to its longitudinal direction) is similar to, for example, the range of the width w of the microstrip-type electrode 4 described above. The dimension of the signal electrode 61 in its longitudinal direction may be set to any appropriate dimension.

The thickness of the conductor layer 6 is, for example, 1 μm or more, preferably 4 μm or more, and is, for example, 20 μm or less, preferably 10 μm or less.

In each of the waveguide elements illustrated in FIG. 1 to FIG. 8, the ground electrode 3 is formed on the back surface of the inorganic material substrate 1 (the other surface in its thickness direction), and is brought into direct contact with the inorganic material substrate 1. In addition, the ground electrode 3 is formed of a metal similar to that of the conductor layer 6, and the range of the thickness of the ground electrode 3 is similar to the range of the thickness of the conductor layer 6. The ground electrode 3 is formed on the inorganic material substrate 1 by, for example, sputtering.

As long as the ground electrode 3 is arranged on the opposite side to the conductor layer 6 with respect to the inorganic material substrate 1, its arrangement is not particularly limited. In one embodiment, the ground electrode 3 is formed on the surface of the supporting substrate 20, and is brought into direct contact with the supporting substrate 20. That is, the waveguide element (specifically the waveguide element 101 or the waveguide element 102) may include the ground electrode 3 on the surface of the supporting substrate 20 on the side on which the waveguide member is formed. In this case, the ground electrode 3 is formed on the supporting substrate 20 by, for example, sputtering.

D. First Metal Layer

In each of the waveguide elements illustrated in FIG. 12 to FIG. 19, the ground electrode 3 may be referred to as "first metal layer 3." In one embodiment, as illustrated in FIG. 12, the first metal layer 3 is arranged on the surface of the inorganic material substrate 1 on the opposite side to the conductor layer 6. The first metal layer 3 is arranged at a distance from the signal electrode 61 in the thickness direction of the inorganic material substrate 1. The first metal layer 3 is typically brought into direct contact with the inorganic material substrate 1. The first metal layer 3 may be formed of a metal similar to that of the conductor layer 6. From the viewpoint of joining the inorganic material substrate 1 and the supporting substrate 7 to each other, the first metal layer 3 needs to secure adhesive strength with which joining surfaces can be easily planarized, and the metal of the first metal layer 3 may be different from the metal of the conductor layer 6. The range of the thickness of the first metal layer 3 is similar to the range of the thickness of the conductor layer 6.

The first metal layer 3 is typically formed on the inorganic material substrate 1 by sputtering or plating.

E. Second Metal Layer

As illustrated in FIG. 12, the second metal layer 40 is arranged on the surface of the supporting substrate 7 on the opposite side to the first metal layer 3. The second metal layer 40 is sometimes referred to as "back-surface conductor layer." The second metal layer 40 is arranged at a distance from the first metal layer 3 in the thickness direction of the inorganic material substrate 1. The second metal layer 40 is typically brought into direct contact with the supporting substrate 7. The second metal layer 40 is formed of a metal similar to that of the conductor layer 6, and the range of the thickness of the second metal layer 40 is similar to the range of the thickness of the conductor layer 6. The second metal layer 40 is formed on the supporting substrate 7 by, for example, sputtering or plating. The second metal layer 40 is not necessarily required to be formed over the entire surface of the supporting substrate 7 on the opposite side to the first metal layer.

F. Supporting Substrate

In each of the waveguide elements illustrated in FIG. 1 to FIG. 8, the supporting substrate 20 has an upper surface positioned inside the composite substrate, and a lower surface exposed to the outside. The supporting substrate 20 is arranged in order to enhance the strength of the composite substrate. In each of the waveguide elements illustrated in FIG. 12 to FIG. 19, the supporting substrate 7 can impart excellent mechanical strength to the waveguide element. Thus, the thickness of the inorganic material substrate can be reduced so as to satisfy the expression (1). When the term "supporting substrate" is used without a reference numeral in the following description, the supporting substrate may encompass the supporting substrate 20 and the supporting substrate 7 without distinguishing therebetween.

Any appropriate configuration may be adopted as the supporting substrate. Specific examples of a material for forming the supporting substrate include indium phosphide (InP), silicon (Si), glass, SiAlON ($Si_3N_4$—$Al_2O_3$), mullite ($3Al_2O_3 \cdot 2SiO_2$, $2Al_2O_3 \cdot 3SiO_2$), aluminum nitride (AlN), magnesium oxide (MgO), aluminum oxide ($Al_2O_3$), spinel ($MgAl_2O_4$), sapphire, quartz, crystal, gallium nitride (GaN), silicon carbide (SiC), silicon nitride ($Si_3N_4$), and gallium oxide ($Ga_2O_3$).

The supporting substrate is preferably formed of at least one kind selected from the group consisting of: indium phosphide; silicon; aluminum nitride; silicon carbide; and silicon nitride, and is more preferably formed of silicon.

When an active element, such as a oscillator or a receiver, is mounted on the waveguide element, there is a risk in that the inorganic material substrate may be heated to degrade the characteristics of the other active element or mounted part. In order to prevent this situation, a material having a high thermal conductivity may be used for the supporting substrate. In this case, the thermal conductivity is preferably 150 W/Km or more, and from this viewpoint, examples of the supporting substrate include silicon (Si), aluminum nitride (AlN), gallium nitride (GaN), silicon carbide (SiC), and silicon nitride ($Si_3N_4$).

In addition, when a SIW is formed in the supporting substrate, a material having a small dielectric loss tan δ is preferred in order to reduce the loss of the electromagnetic wave to be propagated in the SIW. From this viewpoint, the material may be exemplified by monocrystalline quartz, amorphous quartz, spinel, AlN, sapphire, aluminum oxide, SiC, magnesium oxide, and silicon.

The linear expansion coefficient of the material for forming the supporting substrate is preferably as close to the linear expansion coefficient of the material for forming the inorganic material substrate 1 as possible. With such configuration, thermal deformation (typically, warpage) of the composite substrate can be suppressed. The linear expansion coefficient of the material for forming the supporting substrate preferably falls within the range of from 50% to 150% with respect to the linear expansion coefficient of the material for forming the inorganic material substrate 1.

In addition, the dielectric loss tangent of the material for forming the supporting substrate is preferably smaller. When the dielectric loss tangent is reduced, the propagation loss can be suppressed. From this viewpoint, the dielectric loss tangent of the supporting substrate is preferably 0.07 or less.

In addition, in a coplanar line, the dielectric loss tangent of the material for forming the supporting substrate is preferably smaller. In the case of a coplanar line, when the thickness of the waveguide member is small, the propagating electromagnetic wave may leak to the supporting substrate, and the propagation loss can be suppressed by reducing the dielectric loss tangent. From this viewpoint, the dielectric loss tangent is preferably 0.07 or less.

The thickness of the supporting substrate is, for example, $\lambda/4\sqrt{\varepsilon_b}$ or more, preferably $\lambda/2\sqrt{\varepsilon_b}$ or more, and for example, $2\lambda/\sqrt{\varepsilon_b}$ or less, preferably $3\lambda/2\sqrt{\varepsilon_b}$ or less, more preferably $\lambda/\sqrt{\varepsilon_b}$ or less, where $\varepsilon_b$ represents the relative dielectric constant of the supporting substrate, and λ represents the wavelength of the electromagnetic wave to be guided by the waveguide element (waveguide member). When the thickness of the supporting substrate is equal to or larger than the above-mentioned lower limits, an improvement in mechanical strength of the waveguide element can be stably achieved. When the thickness of the supporting substrate is equal to or smaller than the above-mentioned upper limits, the suppression of slab-mode propagation, the thinning of the waveguide element (retention of the mechanical strength of the waveguide element), and the suppression of substrate resonance can be achieved.

As illustrated in FIG. 18, in the case where a plurality of supporting substrates are arranged at a distance from each other in the thickness direction of the inorganic material substrate 1, when the waveguide element is used as a phased array antenna, the distance between the supporting substrates adjacent to each other is desirably about λ/2, which is suited for an antenna pitch. However, in the case where the thickness of each of the supporting substrates is less than the distance, an appropriate antenna pitch can be secured by arranging the spacer substrate 14 (see FIG. 19) between the supporting substrates adjacent to each other.

In each of the waveguide elements illustrated in FIG. 1 to FIG. 8, the supporting substrate 20 typically supports the waveguide member (waveguide member 10, 11, or 12) by being directly joined to the waveguide member (waveguide member 10, 11, or 12). In other words, the waveguide member and the supporting substrate are directly joined to each other. In each of the waveguide elements illustrated in FIG. 12 to FIG. 19, the supporting substrate 7 supports the conductor layer 6, the inorganic material substrate 1, the first metal layer 3, and the second metal layer 40. More specifically, the inorganic material substrate 1 and the supporting substrate 7 are directly joined to each other via the first metal layer 3 without an organic adhesive (e.g., an adhesive such as a resin) being present between the inorganic material substrate 1 and the supporting substrate 7.

As used herein, the term "direct joining" means that two layers or substrates are joined to each other without an adhesive (typically an organic adhesive) being interposed therebetween. The form of the direct joining may be appropriately set in accordance with the configurations of the layers or substrates to be joined to each other. Further, an interface joined by the direct joining is typically amorphized. Accordingly, the thermal resistance of the joining interface can be dramatically reduced as compared to resin joining. Thus, in the case where an active element, such as an oscillator or a receiver, is mounted on the waveguide element, even when heat generated from the active element is transferred to the inorganic material substrate, such heat can be smoothly allowed to escape from the inorganic material substrate to a package via the supporting substrate. As a result, heating of the inorganic material substrate can be suppressed, and hence degradations in characteristics of the other active element or mounted part can be suppressed. The form of the direct joining may also include joining of the supporting substrate and the inorganic material substrate to each other via the ground electrode (first metal layer) and/or a joining portion.

When those components are integrated by the direct joining, peeling in the waveguide element can be satisfactorily suppressed, and as a result, damage (e.g., a crack) to the inorganic material substrate resulting from such peeling can be satisfactorily suppressed.

Each of the waveguide elements illustrated in FIG. 1 to FIG. 8 (each of the waveguide elements 100, 101, and 102) may further include a joining portion 30, which is arranged between the waveguide member (waveguide member 10, 11, or 12) and the supporting substrate 20, and which joins the waveguide member 10 and the supporting substrate 20 to each other.

Figure 9A:
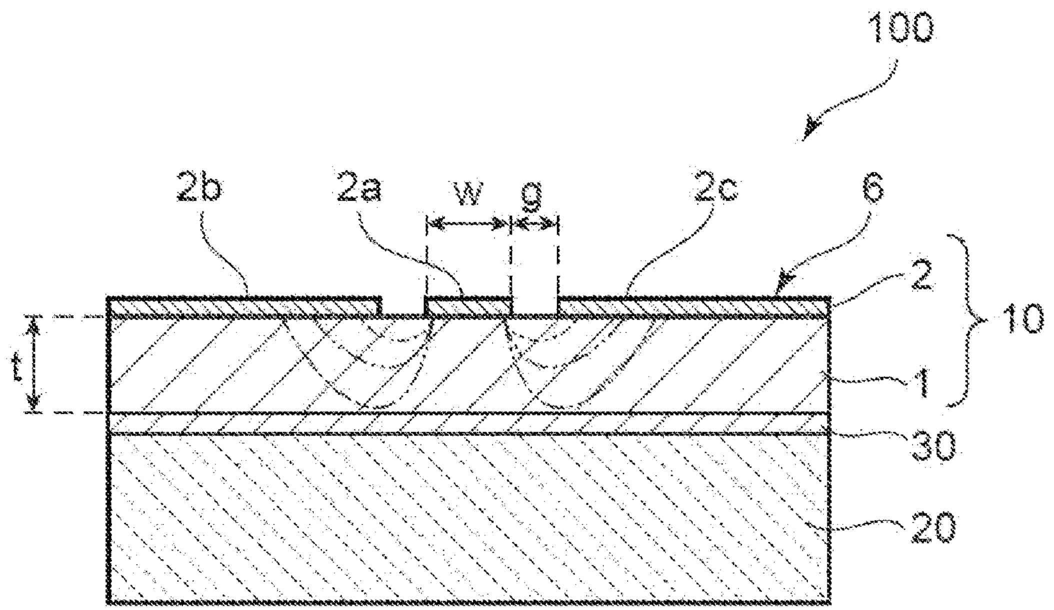
FIG. 9A is a schematic cross-sectional view of a mode in which the waveguide element of FIG. 1 includes a joining portion.

Specifically, in the waveguide element 100 illustrated in FIG. 1 and FIG. 2, the joining portion 30 may be positioned between, and integrate, the inorganic material substrate 1 and the supporting substrate 20 as illustrated in FIG. 9A. In such configuration, only the inorganic material substrate 1 and the joining portion 30 may be arranged between the conductor layer 6 and the supporting substrate 20. It is preferred that an organic material-based adhesive or a resin material such as a resin material substrate be not interposed between the conductor layer 6 and the supporting substrate 20 (i.e., the configuration therebetween be formed of inorganic materials (including the inorganic material substrate 1)). Thus, thermal resistance at an interface between the inorganic material substrate 1 and the supporting substrate 20 can be reduced, and hence degradations in characteristics of the active element or the mounted part can be suppressed. A structure in which no resin material is interposed is obtained by directly joining the inorganic material substrate 1 and the supporting substrate 20 to each other.

Figure 9B:
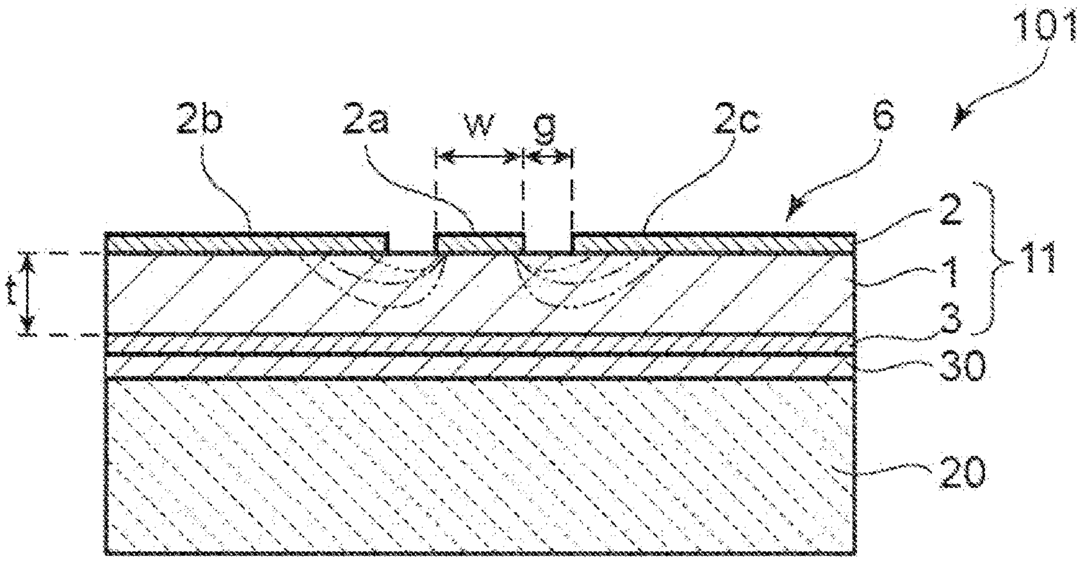
FIG. 9B is a schematic cross-sectional view of a mode in which the waveguide element of FIG. 3 includes a joining portion.
Figure 10A:
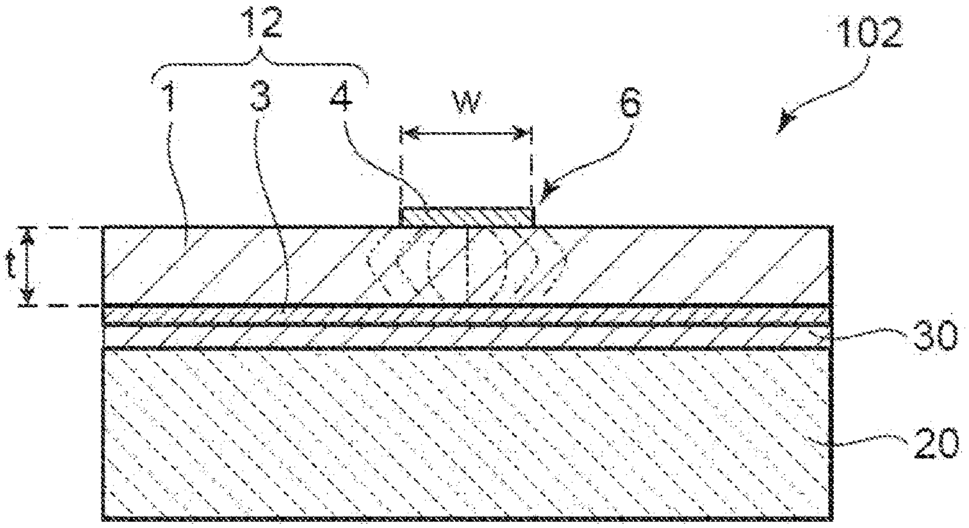
FIG. 10A is a schematic cross-sectional view of a mode in which the waveguide element of FIG. 5 includes a joining portion.
Figure 11A:
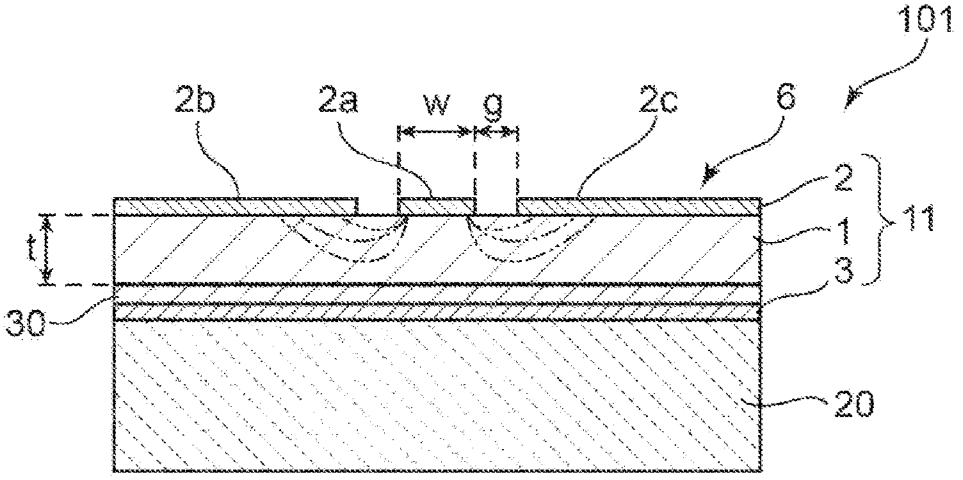
FIG. 11A is a schematic cross-sectional view of a mode in which, in the waveguide element of FIG. 3, the joining portion is arranged between an inorganic material substrate and a ground electrode.
Figure 11B:
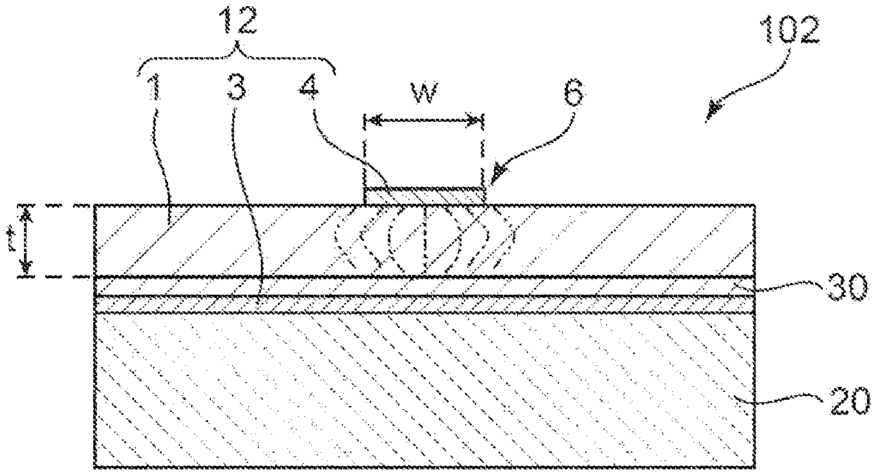
FIG. 11B is a schematic cross-sectional view of a mode in which, in the waveguide element of FIG. 5, the joining portion is arranged between the inorganic material substrate and the ground electrode.

In addition, in the waveguide element 101 illustrated in FIG. 3 and FIG. 4, the joining portion 30 may be positioned between, and integrate, the ground electrode 3 and the supporting substrate 20 as illustrated in FIG. 9B, or the joining portion 30 may be positioned between, and integrate, the ground electrode 3 and the inorganic material substrate 1 as illustrated in FIG. 11A. In addition, in the waveguide element 102 illustrated in FIG. 5 and FIG. 6, the joining portion 30 may be positioned between, and integrate, the ground electrode 3 and the supporting substrate 20 as illustrated in FIG. 10A, or the joining portion 30 may be positioned between, and integrate, the ground electrode 3 and the inorganic material substrate 1 as illustrated in FIG. 11B. In each of those configurations, only the inorganic material substrate 1, the ground electrode 3, and the joining portion 30 may be arranged between the conductor layer 6 and the supporting substrate 20.

Figure 10B:
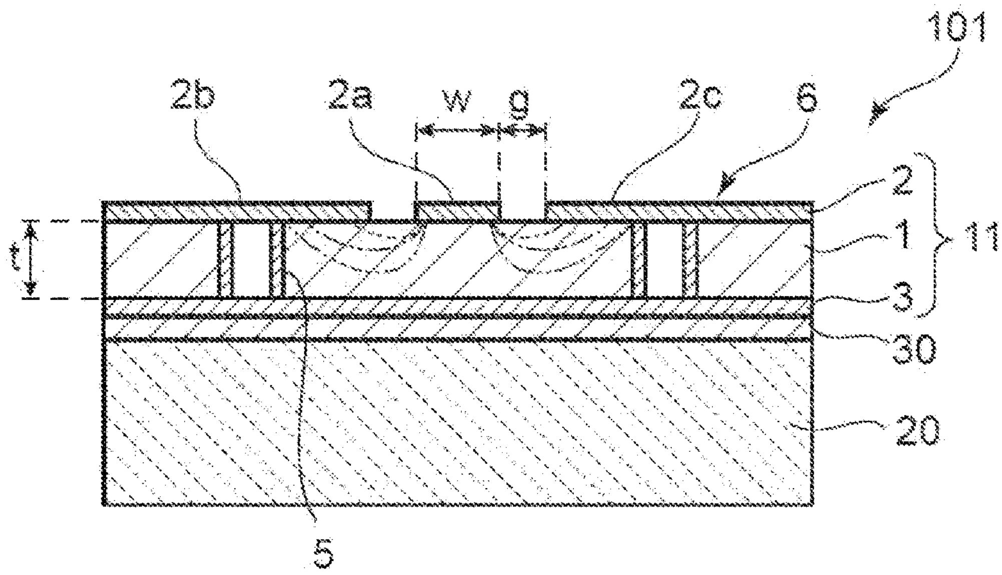
FIG. 10B is a schematic cross-sectional view of an embodiment in which the waveguide element of FIG. 7 includes a joining portion.
Figure 11C:
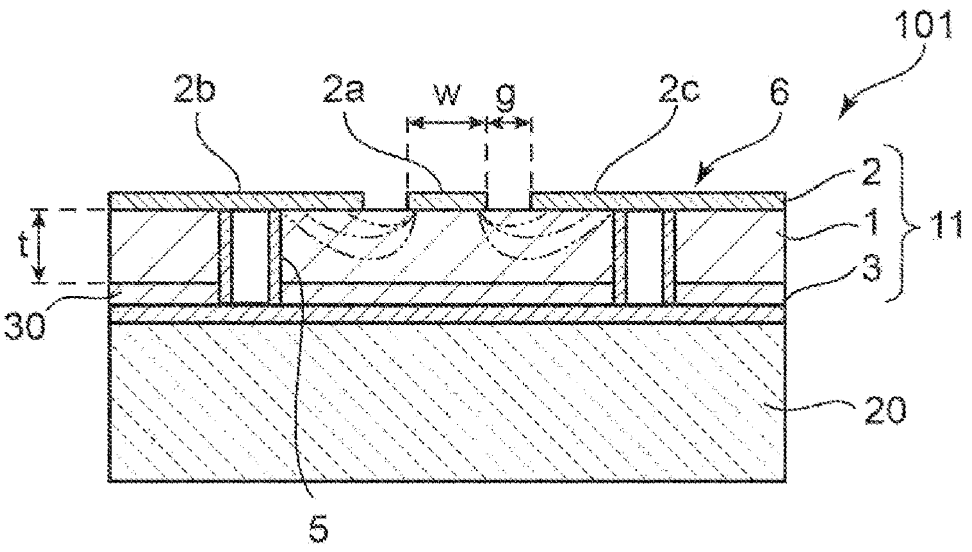
FIG. 11C is a schematic cross-sectional view of a mode in which, in the waveguide element of FIG. 7, the joining portion is arranged between the inorganic material substrate and the ground electrode.

In addition, in the waveguide element 101 illustrated in FIG. 7 and FIG. 8, the joining portion 30 may be positioned between, and integrate, the ground electrode 3 and the supporting substrate 20 as illustrated in FIG. 10B, or the joining portion 30 may be positioned between, and integrate, the ground electrode 3 and the inorganic material substrate 1 as illustrated in FIG. 11C. In each of those configurations, only the inorganic material substrate 1 including the vias 5, the ground electrode 3, and the joining portion 30 may be arranged between the conductor layer 6 and the supporting substrate 20.

In addition, although not shown, a back-surface conductor layer may be arranged on the surface of the supporting substrate 20 on the opposite side to the surface on the side on which the waveguide member is arranged. The back-surface conductor layer is typically positioned on the opposite side to the ground electrode 3 with respect to the supporting substrate 20. The back-surface conductor layer may be formed on the back surface of the supporting substrate 20 (the other surface in its thickness direction) to be brought into direct contact with the supporting substrate 20. The back-surface conductor layer is formed of a metal similar to that of the conductor layer 6, and the range of the thickness of the back-surface conductor layer is similar to the range of the thickness of the conductor layer 6. The back-surface conductor layer is formed on the supporting substrate 20 by, for example, sputtering.

In each of the waveguide elements illustrated in FIG. 12 to FIG. 19 (each of the waveguide elements 103, 104, 105, and 106), the supporting substrate 7 is directly joined to the inorganic material substrate 1 via only the first metal layer 3. When the supporting substrate 7 is joined to the inorganic material substrate 1 via only the first metal layer 3, the first metal layer 3 functions as a joining portion that joins the inorganic material substrate 1 and the supporting substrate 7 to each other, and the supporting substrate 7 is brought into direct contact with the first metal layer 3.

In addition, the supporting substrate 7 may be directly joined to the inorganic material substrate 1 via the first metal layer 3 and a joining portion (not shown). When the supporting substrate 7 is joined to the inorganic material substrate 1 via the first metal layer 3 and the joining portion, the joining portion may be arranged between the inorganic material substrate 1 and the first metal layer 3, and may be arranged between the first metal layer 3 and the supporting substrate 7. That is, the joining portion is arranged between the inorganic material substrate and the first metal layer, and/or between the first metal layer and the supporting substrate.

As described above, it is preferred that an organic material-based adhesive or a resin material such as a resin material substrate be not interposed between the conductor layer and the supporting substrate (i.e., the configuration therebetween be formed of inorganic materials (including the inorganic material substrate)). Thus, thermal resistance at an interface between the inorganic material substrate and the supporting substrate can be reduced, and hence degradations in characteristics of the active element or the mounted part can be suppressed. A structure in which no resin material is interposed is obtained by directly joining the inorganic material substrate and the supporting substrate to each other (any one or both of the inorganic material substrate and the supporting substrate have the ground electrode (first metal layer) formed thereon).

The joining portion may be one layer, or may be a laminate of two or more layers. The joining portion is typically formed of an inorganic material. Examples of the joining portion include a $SiO_2$ layer, an amorphous silicon layer, and a tantalum oxide layer. In addition, the ground electrode is a metal, and hence the joining portion may be a metal selected from gold (Au), titanium (Ti), platinum (Pt), chromium (Cr), copper (Cu), tin (Sn), or combinations (alloys) thereof. Of those joining portions, an amorphous silicon layer is a preferred example. In addition, from the viewpoints of securing adhesive strength and preventing migration, a metal film of Ti, Cr, Ni, Pt, or Pd may be formed as an intermediate layer between the inorganic material substrate and the ground electrode (first metal layer) or between the supporting substrate and the ground electrode (first metal layer).

The thickness of the joining portion is, for example, 0.001 μm or more and 10 μm or less, preferably 0.1 μm or more and 3 μm or less.

When the waveguide member and the supporting substrate are directly joined to each other without the arrangement of the joining portion, only the inorganic material substrate may be arranged between the conductor layer and the supporting substrate.

The direct joining may be achieved by, for example, the following procedure. In a high-vacuum chamber (e.g., about $1\times10^{-6}$ Pa), the joining surface of each of components (layers or substrates) to be joined to each other is irradiated with a neutralized beam. Thus, each joining surface is activated. Then, in a vacuum atmosphere, the activated joining surfaces are brought into contact with each other, and are joined to each other at ordinary temperature. A load at the time of the joining may be, for example, from 100 N to 20,000 N. In one embodiment, when the surface activation with a neutralized beam is performed, an inert gas is introduced into a chamber, and a high voltage is applied from a DC power source to an electrode arranged in the chamber. With such configuration, an electric field generated between the electrode (positive electrode) and the chamber (negative electrode) causes electrons to move to generate atomic and ion beams derived from the inert gas. Among the beams that have reached a grid, the ion beam is neutralized at the grid, and hence a beam of neutral atoms is emitted from a high-speed atomic beam source. An atomic species for forming the beam is preferably an inert gas element (e.g., argon (Ar) or nitrogen (N)). At the time of the activation by beam irradiation, a voltage is, for example, from 0.5 kV to 2.0 kV, and a current is, for example, from 50 mA to 200 mA. The method for the direct joining is not limited thereto, and, for example, a surface activation method using a fast atom beam (FAB) or an ion gun, an atomic diffusion method, or a plasma joining method may be applied.

EXAMPLES

The present invention is specifically described below by way of Examples. However, the present invention is not limited by these Examples.

Example 1

1-1. Production of Waveguide Element (Coplanar Line)

The waveguide element illustrated in FIG. 1 and FIG. 2 was produced.

A quartz glass wafer (quartz glass substrate, inorganic material substrate) having a thickness of 0.5 mm was prepared, and a 0.2 μm amorphous silicon film was formed on the quartz glass wafer by sputtering. After the film formation, the amorphous silicon film was polished to be planarized. Here, the arithmetic average roughness of a □10 μm (10 μm square area; the same applies hereinafter) on the surface of the amorphous silicon film was measured using an atomic force microscope, and was found to be 0.2 nm.

In addition, a silicon wafer (supporting substrate) having a thickness of 525 μm was prepared. The arithmetic average roughness of the surface of a 010 μm on the surface of the silicon wafer was measured using an atomic force microscope, and was found to be 0.2 nm.

The amorphous silicon surface of the quartz glass wafer and the silicon wafer were directly joined to each other as described below. First, the quartz glass wafer and the silicon wafer were loaded into a vacuum chamber, and in a vacuum of the order of 10-6 Pa, both joining surfaces (the amorphous silicon surface of the quartz glass wafer and the surface of the silicon wafer) were irradiated with a high-speed Ar neutral atom beam (acceleration voltage: 1 kV, Ar flow rate: 60 sccm) for 70 seconds. After the irradiation, the quartz glass wafer and the silicon wafer were left to stand for 10 minutes to cool, and then the joining surfaces of the quartz glass wafer and the silicon wafer (beam-irradiated surfaces of the quartz glass wafer and the surface of the silicon wafer) were brought into contact with each other, followed by pressurization at 4.90 kN for 2 minutes to join the quartz glass wafer and the silicon wafer to each other. That is, the quartz glass wafer and the silicon wafer were directly joined to each other via an amorphous silicon layer (joining portion). After the joining, polishing processing was performed until the thickness of the quartz glass wafer became 150 μm. Thus, a composite wafer was formed. In the resultant quartz glass/silicon composite substrate, a defect such as peeling was not observed at the joining interface.

Then, a resist was applied to the surface (polished surface) of the quartz glass wafer on the opposite side to the silicon wafer, and patterning was performed by photolithography so as to expose portions for forming a coplanar-type electrode pattern. After that, on the upper surface of the quartz glass wafer exposed from the resist, a Cr film having a thickness of 50 nm and a Ni film having a thickness of 100 nm were formed by sputtering to form an underlying electrode. Further, copper was formed into a film on the underlying electrode by electroplating to form a coplanar-type electrode pattern. The length of a signal electrode in the waveguide direction was 10 mm.

Thus, there was obtained a waveguide element including: a waveguide member including coplanar-type electrodes and an inorganic material substrate; and a supporting substrate.

1-2. Calculation of Propagation Loss

In order to measure the propagation loss of the waveguide element, three waveguide elements having signal electrode lengths of 30 mm, 40 mm, and 50 mm were produced in the same manner as in the foregoing.

Then, an RF signal generator was coupled to the input side of each of the waveguide members with a probe, and an electromagnetic wave was coupled to an RF signal receiver placed for the probe on the output side of the waveguide member.

Then, a voltage was applied to the RF signal generator to cause the RF signal generator to transmit an electromagnetic wave having a frequency shown in Table 1. Thus, the electromagnetic wave was propagated to the coplanar line (waveguide member). The RF signal receiver measured the RF power of the electromagnetic wave output from the coplanar line. A propagation loss (dB/cm) was calculated from the measurement results of the three waveguide elements having different signal electrode lengths, and was evaluated by the following criteria. The results are shown in Table 1.

◎ (excellent): less than 0.5 dB/cm

○ (good): 0.5 dB/cm or more and less than 1 dB/cm

Δ (acceptable): 1 dB/cm or more and less than 2 dB/cm

× (unacceptable): 2 dB/cm or more

Example 2

2-1. Production of Waveguide Element (Grounded Coplanar Line)

The waveguide element illustrated in FIG. 3 and FIG. 4 was produced.

A quartz glass wafer (quartz glass substrate, inorganic material substrate) having a thickness of 0.5 mm was prepared, and a Cr film having a thickness of 50 nm and a Ni film having a thickness of 100 nm were formed on the quartz glass wafer by sputtering to form an underlying electrode. Further, copper was formed into a film on the underlying electrode by electroplating to form a ground electrode. Then, a 0.2 μm amorphous silicon film was formed on the ground electrode by sputtering. After the film formation, the amorphous silicon film was polished to be planarized. Here, the arithmetic average roughness of a 010 μm on the surface of the amorphous silicon film was measured using an atomic force microscope, and was found to be 0.2 nm.

In addition, a silicon wafer (supporting substrate) having a thickness of 525 μm was prepared. The arithmetic average roughness of the surface of a 010 μm on the surface of the silicon wafer was measured using an atomic force microscope, and was found to be 0.2 nm.

After that, the amorphous silicon surface formed on the ground electrode and the silicon wafer were directly joined to each other. The direct joining was carried out in the same manner as in Example 1. That is, the ground electrode and the silicon wafer were directly joined to each other via an amorphous silicon layer (joining portion). In the resultant quartz glass/ground electrode/silicon composite substrate, a defect such as peeling was not observed at the joining interface.

Then, the quartz glass wafer was polished to a thickness of 150 μm.

Then, a coplanar-type electrode pattern was formed on the surface (polished surface) of the quartz glass wafer on the opposite side to the silicon wafer in the same manner as in Example 1. The length of the signal electrode in the waveguide direction was 10 mm.

Thus, there was obtained a waveguide element including: a waveguide member including coplanar-type electrodes, an inorganic material substrate, and a ground electrode; and a supporting substrate.

2-2. Calculation of Propagation Loss

In addition, in order to measure the propagation loss of the waveguide element, three waveguide elements having signal electrode lengths of 30 mm, 40 mm, and 50 mm were produced in the same manner as in the foregoing. Then, the RF power of an electromagnetic wave output from the coplanar line was measured with an RF signal receiver in the same manner as in Example 1. The propagation loss of the waveguide element of Example 2 was evaluated in the same manner as in Example 1. The results are shown in Table 1.

Example 3

3-1. Production of Waveguide Element (Microstrip Line)

The waveguide element illustrated in FIG. 5 and FIG. 6 was produced.

A quartz glass/ground electrode/silicon composite substrate was obtained in the same manner as in Example 2.

Then, a resist was applied to the surface (polished surface) of the quartz glass wafer on the opposite side to the silicon wafer, and patterning was performed by photolithography so as to expose portions for forming a microstrip-type electrode. After that, on the upper surface of the quartz glass wafer exposed from the resist, a Cr film having a thickness of 50 nm and a Ni film having a thickness of 100 nm were formed by sputtering to form an underlying electrode. Further, copper was formed into a film on the underlying electrode by electroplating to form a microstrip-type electrode. The length of the microstrip-type electrode in the waveguide direction was 10 mm.

Thus, there was obtained a waveguide element including: a waveguide member including a microstrip-type electrode and an inorganic material substrate; and a supporting substrate.

3-2. Calculation of Propagation Loss

In addition, in order to measure the propagation loss of the waveguide element, three waveguide elements having microstrip-type electrode lengths of 30 mm, 40 mm, and 50 mm were produced in the same manner as in the foregoing. Then, the RF power of an electromagnetic wave output from the coplanar line was measured with an RF signal receiver in the same manner as in Example 1. The propagation loss of the waveguide element of Example 3 was evaluated in the same manner as in Example 1. The results are shown in Table 1.

Examples 4 to 6

Waveguide elements were produced in the same manner as in Examples 1 to 3, respectively, except that the thickness of the quartz glass wafer (inorganic material substrate) after polishing was changed to a value shown in Table 1.

The propagation loss of each of the resultant waveguide elements was calculated and evaluated in the same manner as in Example 1. The results are shown in Table 1.

Example 7

A waveguide element was produced in the same manner as in Example 1 except that: the quartz glass wafer serving as the inorganic material substrate was changed to a monocrystalline silicon wafer; and the thickness of the silicon wafer after polishing was changed to a value shown in Table 1.

The propagation loss of the resultant waveguide element was calculated and evaluated in the same manner as in Example 1. The results are shown in Table 1.

Example 8

A waveguide element was produced in the same manner as in Example 1 except that: the quartz glass wafer serving as the inorganic material substrate was changed to a sapphire wafer; and the thickness of the sapphire wafer after polishing was changed to a value shown in Table 1.

The propagation loss of the resultant waveguide element was calculated and evaluated in the same manner as in Example 1. The results are shown in Table 1.

Example 9

A waveguide element was produced in the same manner as in Example 1 except that: the quartz glass wafer serving as the inorganic material substrate was changed to a polycrystalline AlN wafer; and the thickness of the AlN wafer after polishing was changed to a value shown in Table 1.

The propagation loss of the resultant waveguide element was calculated and evaluated in the same manner as in Example 1. The results are shown in Table 1.

Example 10

A waveguide element was produced in the same manner as in Example 1 except that the thickness of the quartz glass wafer (inorganic material substrate) after polishing was changed to a value shown in Table 1.

The propagation loss of the resultant waveguide element was calculated and evaluated in the same manner as in Example 1. The results are shown in Table 1.

Examples 11 to 14

Waveguide elements were each produced in the same manner as in Example 3 except that the thickness of the quartz glass wafer (inorganic material substrate) after polishing was changed to a value shown in Table 1.

The propagation loss of each of the resultant waveguide elements was calculated and evaluated in the same manner as in Example 1. The results are shown in Table 1.

Example 15

15-1. Production of Waveguide Element (Grounded Coplanar Line)

A waveguide element was produced in the same manner as in Example 2 except that: gold was formed into a film in place of copper to form a ground electrode; and the thickness of the quartz glass wafer (inorganic material substrate) after polishing was changed to 100 μm. The coplanar electrode pattern was designed so as to achieve 50Ω impedance matching with an RF signal generator/receiver.

15-2. Calculation of Propagation Loss

Then, an RF signal generator was coupled to the input side of the waveguide member with a probe, and an electromagnetic wave was coupled to an RF signal receiver placed for the probe on the output side of the waveguide member. Then, a voltage was applied to the RF signal generator to cause the RF signal generator to transmit an electromagnetic wave having a frequency of 300 GHZ. Thus, the electromagnetic wave was propagated to the coplanar line (waveguide member). The RF signal receiver measured the RF power of the electromagnetic wave output from the coplanar line. A propagation loss (dB/cm) was calculated from the measurement results, and the result of the calculation was 0.4 dB/cm (evaluation; ⊚).

15-3. Evaluation of Heat Dissipation Performance

The waveguide element of Example 15 was subjected to thermal conductivity analysis through use of a finite element method (FEMTET manufactured by Murata Software Co., Ltd.). In the thermal conductivity analysis, the thermal conductivity of quartz glass (inorganic material substrate) was assumed to be 2 W/mK, the thermal conductivity of silicon (supporting substrate) was assumed to be 150 W/mK, and the thermal conductivity of gold (ground electrode) was assumed to be 300 W/mK. In Example 15, the waveguide member and the supporting substrate were directly joined to each other, and the joining interface was amorphized, and hence the thermal interfacial resistance of the interface was set to zero. The results of the analysis found that the thermal resistance of the waveguide element was 70 K/W. Thus, an improvement in heat dissipation property by the direct joining was recognized.

Example 16

A waveguide element was produced in the same manner as in Example 15 except that the ground electrode and the silicon wafer were directly joined to each other using solder (AuSn: having a thermal conductivity of 50 W/mK) in place of the amorphous silicon layer. The thermal resistance of the resultant waveguide element was analyzed in the same manner as in the above-mentioned evaluation of heat dissipation performance. As a result, the thermal resistance of the waveguide element was found to be 90 K/W.

Comparative Example 1

A waveguide element was produced in the same manner as in Example 3 except that: a quartz glass wafer (quartz glass plate, inorganic material substrate) having a thickness of 2,100 μm was prepared; and the thickness of the quartz glass wafer after polishing was changed to 2,000 μm.

The propagation loss of the resultant waveguide element was calculated and evaluated in the same manner as in Example 1. The results are shown in Table 1.

Comparative Example 2

A polyimide substrate having a thickness of 100 μm (manufactured by Mitsubishi Gas Chemical Company, Inc., THERPLIM) was prepared, and a ground electrode was formed on the polyimide substrate in the same manner as in Example 15. In addition, a silicon wafer (supporting substrate) having a thickness of 525 μm was prepared. Then, the polyimide substrate having the ground electrode formed thereon and the silicon wafer were joined to each other with a resin (organic adhesive). Then, the quartz glass wafer was polished to a thickness of 100 μm. After that, a coplanar-type electrode pattern was formed on the surface (polished surface) of the polyimide substrate on the opposite side to the silicon wafer in the same manner as in Example 15.

Thus, there was obtained a waveguide element including: a waveguide member including coplanar-type electrodes, a polyimide substrate, and a ground electrode; and a supporting substrate.

The propagation loss of the resultant waveguide element was calculated in the same manner as in Example 1. As a result, the propagation loss was found to be 2.5 dB/cm.

In addition, the thermal resistance of the resultant waveguide element was analyzed in the same manner as in Example 15. As a result, the thermal resistance of the waveguide element was found to be 130 K/W. In the analysis, the thermal conductivity of polyimide was assumed to be 0.2 W/mK.

Comparative Example 3

A waveguide element was obtained in the same manner as in Comparative Example 2 except that the following laminated substrate was used in place of the polyimide substrate having a thickness of 100 μm. The laminated substrate included a quartz glass wafer (thickness: 100 μm) and polyimide layers (thickness: 15 μm, manufactured by Mitsubishi Gas Chemical Company, Inc., THERPLIM) arranged on both thickness-direction surfaces of the quartz glass wafer.

Thus, there was obtained a waveguide element including: a waveguide member including coplanar-type electrodes, a laminated substrate (polyimide layer/quartz glass wafer/polyimide layer), and a ground electrode; and a supporting substrate.

The thermal resistance of the resultant waveguide element was analyzed in the same manner as in Example 15. As a result, the thermal resistance of the waveguide element was found to be 150 K/W. In the analysis, the thermal conductivity of polyimide was assumed to be 0.2 W/mK.

TABLE 1

| No. | | | Example 1 | Example 2 | Example 3 | Example 4 | Example 5 | Example 6 |
|---|---|---|---|---|---|---|---|---|
| Waveguide member | Form | | Coplanar line | Grounded coplanar line | Microstrip line | Coplanar line | Grounded coplanar line | Microstrip line |
| | Inorganic material substrate | Material | | Quartz glass (amorphous) | | | Quartz glass (amorphous) | |
| | | Relative dielectric constant [—] | | 3.6 | | | 3.8 | |
| | | Dielectric loss tangent [—] | | 0.0010 | | | 0.0010 | |
| | | Thickness [μm] | | 150 | | | 80 | |
| | λ/a√ε | λ [μm] | | 1,000 (300 GHz) | | | 1,000 (300 GHz) | |
| | | a = 3 | | 171 | | | 171 | |
| | | a = 6 | | 85 | | | 85 | |
| Evaluation | Propagation loss | 30 GHz | ◎ | ◎ | ◎ | ◎ | ◎ | ◎ |
| | | 300 GHz | ○ | ○ | ○ | ○ | ◎ | ◎ |
| | | 20 THz | X | X | X | X | X | X |

TABLE 1-continued

| No. | | | Example 7 | Example 8 | Example 9 | Example 10 |
|---|---|---|---|---|---|---|
| Waveguide member | Form | | | Coplanar line | | Coplanar line |
| | Inorganic material substrate | Material | Monocrystalline silicon | Sapphire | Polycrystalline AlN | Quartz glass (amorphous) |
| | | Relative dielectric constant [—] | 11.8 | 9.5 | 8.5 | 3.8 |
| | | Dielectric loss tangent [—] | 0.0016 | 0.0030 | 0.0015 | 0.0010 |
| | | Thickness [μm] | 40 | 50 | 50 | 10 |
| $\lambda/a\sqrt{\varepsilon}$ | | λ [μm] | | 1,000 (300 GHz) | | 1,000 (300 GHz) |
| | | a = 3 | 97 | 108 | 114 | 171 |
| | | a = 6 | 49 | 54 | 57 | 85 |
| Evaluation | Propagation loss | 30 GHz | — | ○ | — | ○ |
| | | 300 GHz | ○ | Δ | ○ | ○ |
| | | 20 THz | X | X | X | X |

| No. | | | Example 11 | Example 12 | Example 13 | Example 14 | Comparative Example 1 |
|---|---|---|---|---|---|---|---|
| Waveguide member | Form | | | Microstrip line | | | Microstrip line |
| | Inorganic material substrate | Material | | Quartz glass (amorphous) | | | Quartz glass (amorphous) |
| | | Relative dielectric constant [—] | | 3.8 | | | 3.8 |
| | | Dielectric loss tangent [—] | | 0.0010 | | | 0.0010 |
| | | Thickness [μm] | 1,500 | 200 | 50 | 2.0 | 2,000 |
| $\lambda/a\sqrt{\varepsilon}$ | | λ [μm] | 10,000 (30 GHz) | 3,000 (100 GHz) | 600 (500 GHz) | 15 (20 THz) | 1,000 (300 GHz) |
| | | a = 3 | 1,710 | 513 | 103 | 2.56 | 171 |
| | | a = 6 | 855 | 256 | 51 | 1.28 | 85 |
| Evaluation | Propagation loss | 30 GHz | ○ | ◎ | ◎ | ◎ | X |
| | | 300 GHz | X | X | ◎ | ◎ | X |
| | | 20 THz | X | X | X | ○ | X |

As apparent from Table 1, it is found that, in the case where the thickness of the inorganic material substrate satisfies the expression (1), even when a high-frequency electromagnetic wave of more than 30 GHz is guided, the propagation loss is small, and excellent low-propagation loss performance can be secured.

The waveguide element according to the embodiments of the present invention can be used in a wide range of fields, such as waveguides, next-generation high-speed communication, sensors, laser processing, and solar power generation, and in particular, can be suitably used as a waveguide for a millimeter wave/terahertz wave. Such waveguide element can be used for, for example, an antenna, a band-pass filter, a coupler, a delay line (phase shifter), or an isolator.

What is claimed is:

1. A waveguide element, comprising a waveguide member capable of guiding an electromagnetic wave having a frequency of 30 GHz or more and 20 THz or less, and a supporting substrate, which is arranged below the waveguide member, and is configured to support the waveguide member, wherein the waveguide member includes:

an inorganic material substrate; and a conductor layer arranged above the inorganic material substrate, wherein the inorganic material substrate is a quartz glass substrate, and wherein a thickness "t" of the inorganic material substrate satisfies the following expression (1):

$$t < \frac{\lambda}{a\sqrt{\varepsilon}} \tag{1}$$

where "t" represents the thickness of the inorganic material substrate, λ represents a wavelength of an electromagnetic wave to be guided by the waveguide member, ε represents a relative dielectric constant of the inorganic material substrate at 300 GHz, and "a" represents a numerical value of 3 or more.

2. The waveguide element according to claim 1, wherein, in the expression (1), "a" represents a numerical value of 6 or more.

3. The waveguide element according to claim 1, wherein the inorganic material substrate has a relative dielectric constant ε of 3.5 or more and 12.0 or less and a dielectric loss tangent (dielectric loss) tan δ of 0.003 or less at 300 GHz.

4. The waveguide element according to claim 1, wherein the conductor layer is coplanar-type electrodes.

5. The waveguide element according to claim 4, wherein, when the frequency of the electromagnetic wave to be propagated through the waveguide member is 30 GHz or more and 5 THz or less, the thickness of the inorganic material substrate is 10 μm or more.

6. The waveguide element according to claim 1, wherein the thickness of the inorganic material substrate is 31 μm or more.

7. The waveguide element according to claim 1, wherein the thickness of the inorganic material substrate is 100 μm or less.

8. The waveguide element according to claim 4, further comprising a ground electrode arranged on a surface of the inorganic material substrate on an opposite side to a surface thereof on which the conductor layer is provided.

9. The waveguide element according to claim 1, wherein the conductor layer is a microstrip-type electrode, and wherein the waveguide element further comprises a ground electrode arranged on a surface of the inorganic material substrate on an opposite side to a surface thereof on which the conductor layer is provided.

10. The waveguide element according to claim 1, further comprising:

the supporting substrate positioned on an opposite side to the conductor layer with respect to the inorganic material substrate;

a first metal layer positioned between the inorganic material substrate and the supporting substrate;

a second metal layer positioned on an opposite side to the inorganic material substrate with respect to the supporting substrate; and a plurality of through-substrate vias configured to electrically connect the first metal layer and the second metal layer to each other, wherein the conductor layer includes a signal electrode, which extends in a predetermined direction, and which constitutes a transmission line capable of propagating the electromagnetic wave, and wherein the first metal layer, the second metal layer, and the plurality of through-substrate vias constitute a substrate-integrated waveguide capable of propagating the electromagnetic wave.

11. The waveguide element according to claim 10, wherein the conductor layer further includes a ground electrode arranged at a distance from the signal electrode.

12. The waveguide element according to claim 11, further comprising a via configured to electrically connect the ground electrode and the first metal layer to each other.

13. The waveguide element according to claim 10, further comprising a conductor pin configured to couple the transmission line and the substrate-integrated waveguide to each other so as to enable the electromagnetic wave to be propagated, wherein the conductor pin penetrates through the inorganic material substrate from the signal electrode to reach the substrate-integrated waveguide in the supporting substrate.

14. The waveguide element according to claim 13, wherein the first metal layer has an opening into which the conductor pin is inserted, the opening forming an air layer around the conductor pin.

15. The waveguide element according to claim 10, wherein a plurality of the supporting substrates are arranged at a distance from each other in a thickness direction of the inorganic material substrate, and wherein the substrate-integrated waveguide is arranged in each of the plurality of the supporting substrates.

16. The waveguide element according to claim 15, further comprising a spacer substrate arranged between the supporting substrates adjacent to each other out of the plurality of the supporting substrates.

17. The waveguide element according to claim 10, wherein the inorganic material substrate and the supporting substrate are directly joined to each other via the first metal layer without an organic adhesive being present between the inorganic material substrate and the supporting substrate.

* * * * *